United States Patent [19]
Kubota et al.

[11] Patent Number: 5,687,918
[45] Date of Patent: Nov. 18, 1997

[54] GARBAGE DISPOSAL

[75] Inventors: Tohoru Kubota; Yoshimi Ishikawa; Seizo Ishine; Toshio Ohtsuki; Hiroshi Tamura; Syunro Kawaguchi; Kazuhiro Narusaka, all of Kanagawa-ken; Hidehisa Ide, Osaka-fu, all of Japan

[73] Assignee: Kabushiki Kaisha Toshiba, Kawasaki, Japan

[21] Appl. No.: 404,826

[22] Filed: Mar. 15, 1995

[30] Foreign Application Priority Data

Mar. 15, 1994 [JP] Japan .................... 6-043674
Sep. 30, 1994 [JP] Japan .................... 6-260999

[51] Int. Cl.[6] .................................... B02C 18/40
[52] U.S. Cl. .................... 241/23; 241/24.1; 241/27; 241/33; 241/36; 241/65; 241/DIG. 38
[58] Field of Search ............... 241/23, 24.1, 27, 241/65, 33, 36, DIG. 38, 46.02, 41

[56] References Cited

U.S. PATENT DOCUMENTS

| | | |
|---|---|---|
| 3,706,662 | 12/1972 | Wellford, Jr. ............ 241/DIG. 38 X |
| 3,761,024 | 9/1973 | Schwey et al. ............ 241/23 |
| 3,765,612 | 10/1973 | Wenger ............ 241/23 |
| 3,845,939 | 11/1974 | Waldenville ............ 241/98 X |
| 4,058,765 | 11/1977 | Richardson et al. ............ 241/37 X |
| 5,167,372 | 12/1992 | Poggie et al. ............ 241/23 |
| 5,377,921 | 1/1995 | Wirth ............ 241/29 |

*Primary Examiner*—John M. Husar
*Attorney, Agent, or Firm*—Cushman Darby & Cushman Intellectual Property Group of Pillsbury Madison & Sutro LLP

[57] ABSTRACT

A garbage disposal for decomposing garbage with microorganisms. The garbage disposal has a tank containing a mixture of garbage, a medium having microorganisms, stirring means for stirring the mixture in the tank in order to supply air into the mixture, and control means for controlling water content percentage of the mixture. The control means controls a stirring of the mixture and/or a temperature of the mixture and/or an air volume blown on the mixture in order to keep water content percentage in a proper value at which the microorganisms are active and a lifetime of the medium is extended.

42 Claims, 27 Drawing Sheets

WP: WATER CONTENT PERCENTAGE (wt%)
Tm: MIXTURE TEMPERATURE (°C)

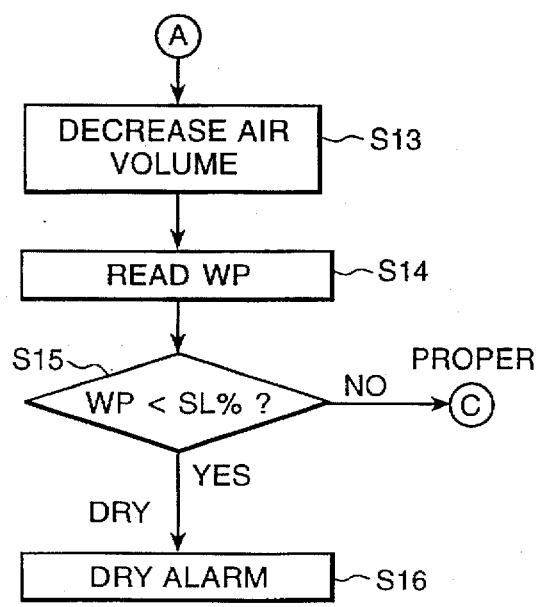
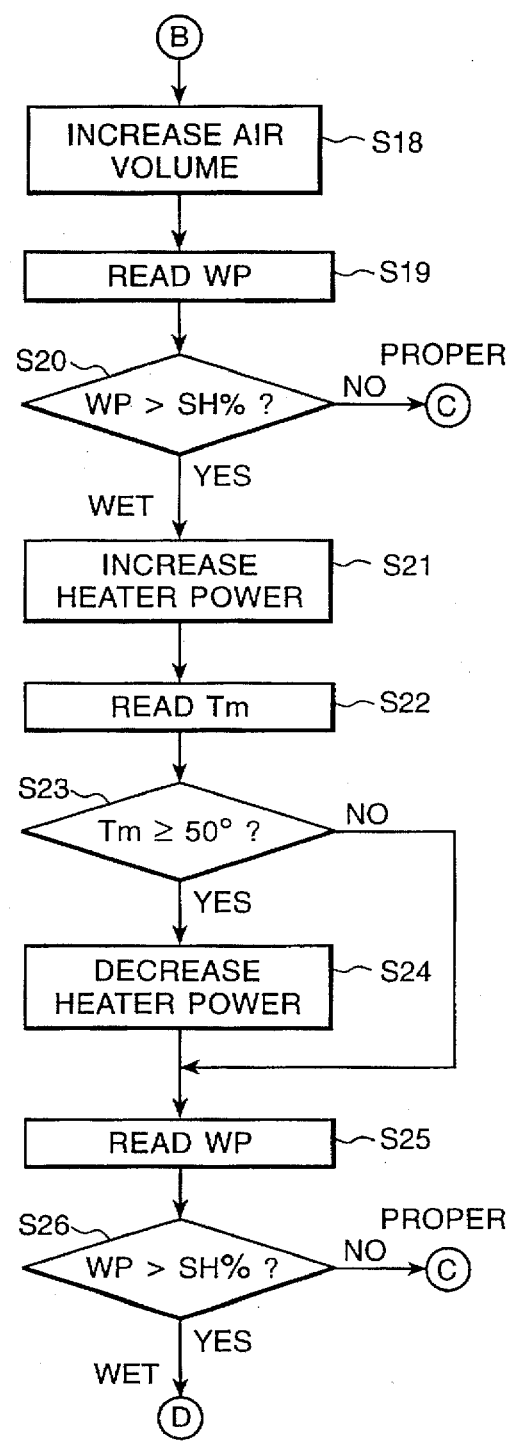
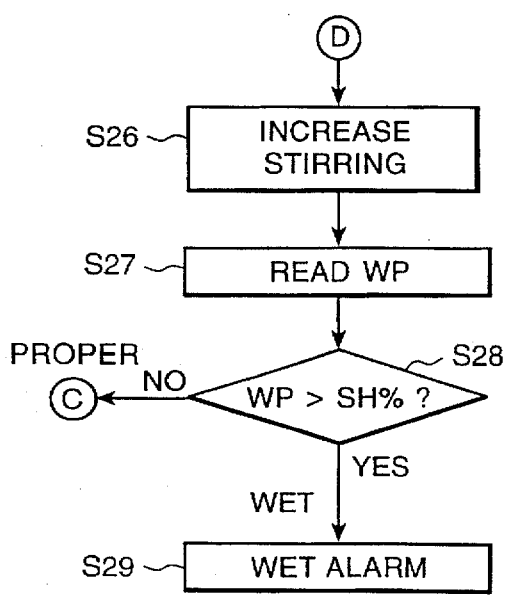

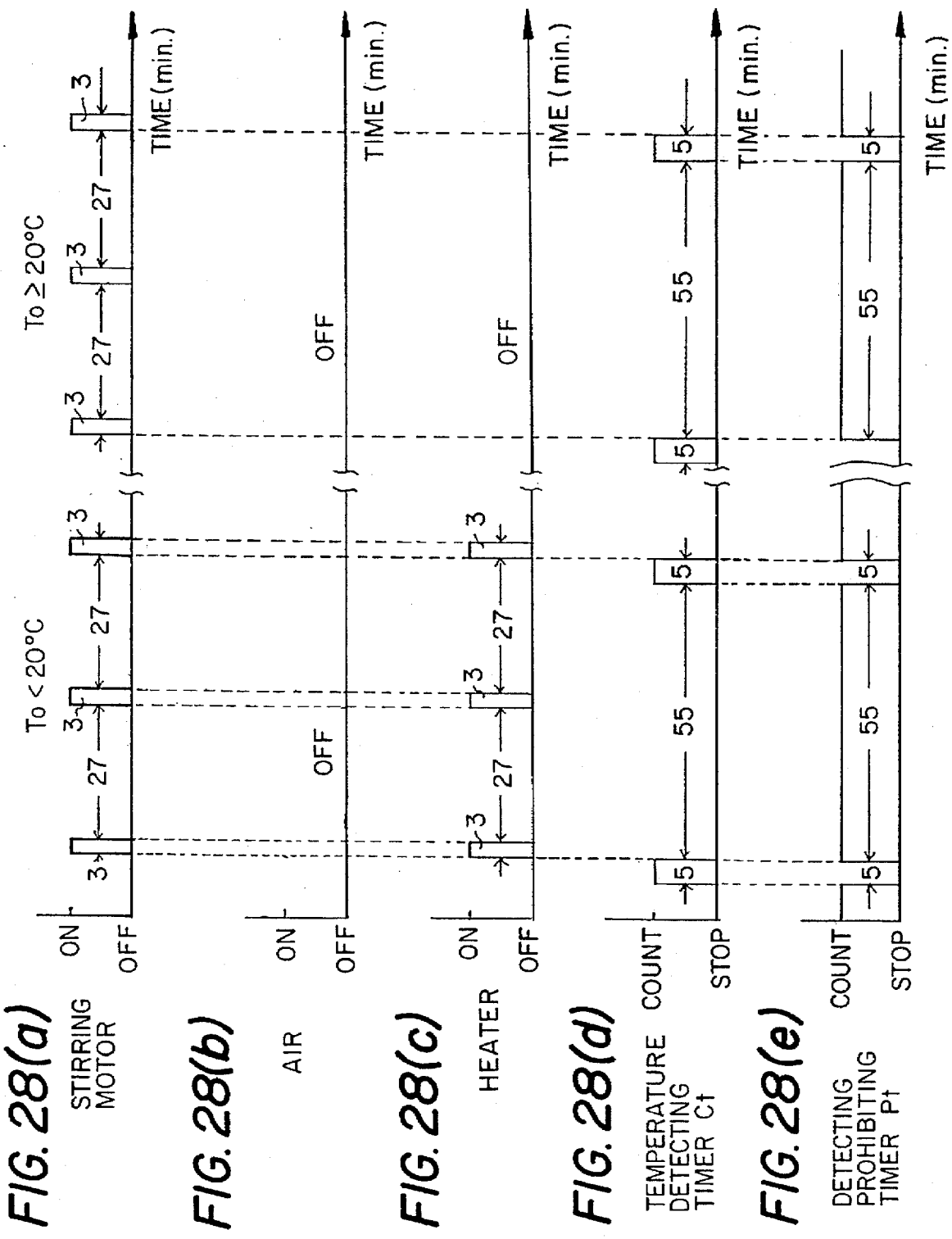

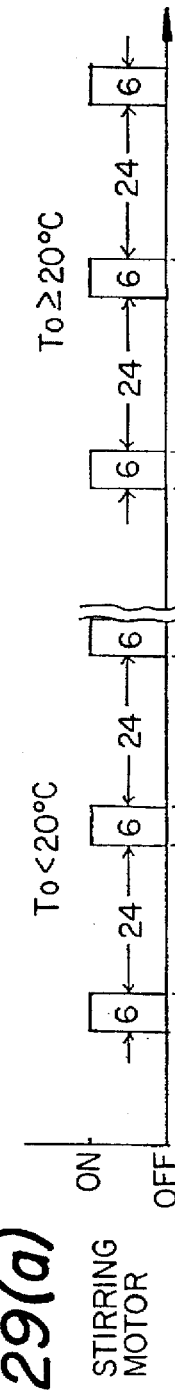
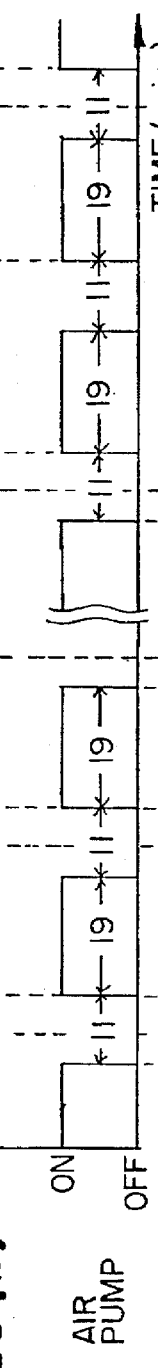
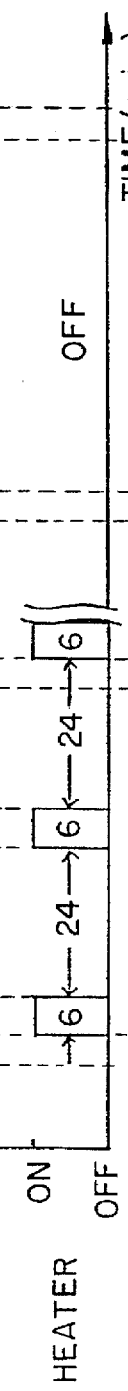
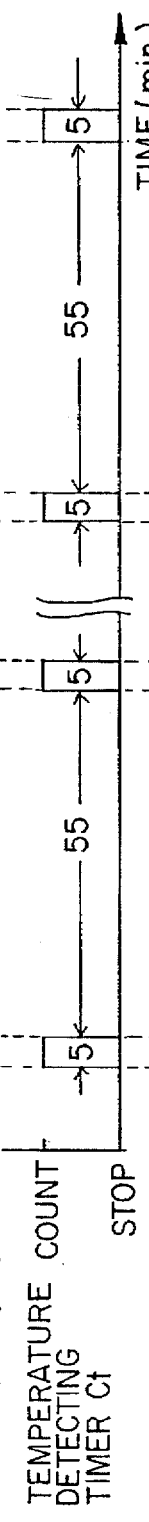
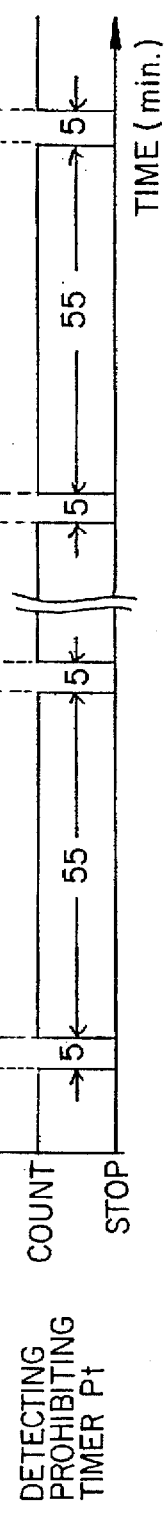
FIG. 29(a) STIRRING MOTOR
FIG. 29(b) AIR PUMP
FIG. 29(c) HEATER
FIG. 29(d) TEMPERATURE DETECTING TIMER Ct
FIG. 29(e) DETECTING PROHIBITING TIMER Pt

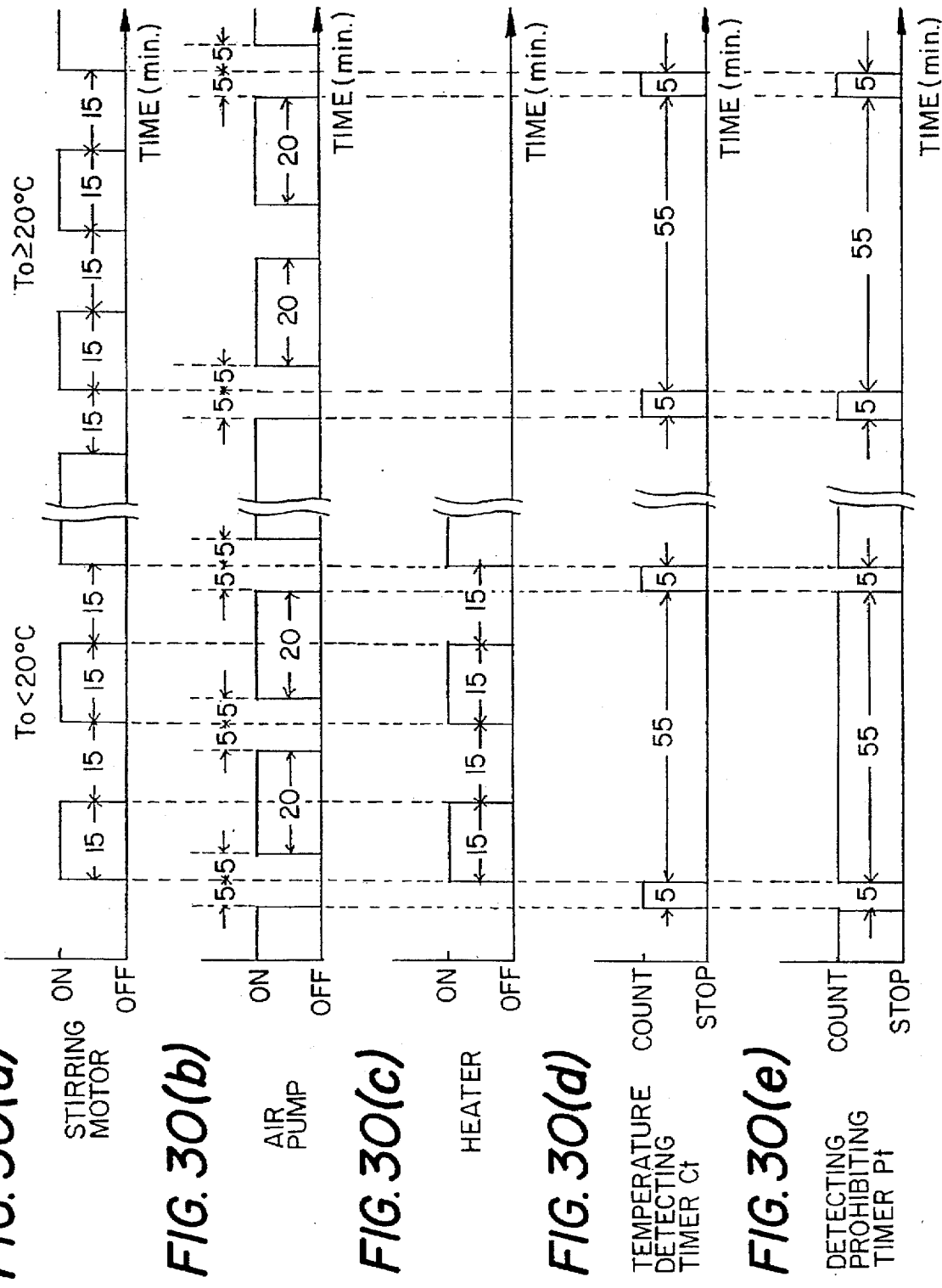

GARBAGE DISPOSAL

BACKGROUND OF THE INVENTION

1. Field of the Invention

The present invention relates to garbage disposals that decompose garbage with microorganisms.

2. Description of Related Art

A known type of garbage disposal has a tank for receiving and decomposing garbage. The tank contains sawdust and aerobic microorganisms. The sawdust is an effective medium for the microorganisms. Kitchen garbage, as it is produced, is put into the tank. The tank contents are stirred to make a mixture of the garbage, sawdust and microorganisms. Aerobic microorganisms which come from soil are activated by automatic and periodic stirring of the tank contents.

Kitchen garbage comprises about 16 wt. % of organic materials, about 4 wt. % of inorganic materials and about 80 wt. % of water. The microorganisms cannot decompose the inorganic materials. Thus, inorganic materials accumulate in the mixture. However, almost all of the organic composition is decomposed into $CO_2$ and water. Water included in the garbage and produced by the decomposing is absorbed by the sawdust, after which it evaporates and is diffused into the air. The sawdust must be changed at predetermined intervals. In this known garbage disposal, the lifetime of sawdust is shorter than 6 months. It is difficult to lengthen the lifetime of sawdust for various reasons: 1) Inorganic materials accumulate in the sawdust, making it difficult for the microorganisms to thrive. 2) Air required by the microorganisms cannot be supplied in the mixture. 3) Water contained in the mixture increases. The mixture becomes clay-like so that air supply decreases and the ability of the microorganisms likewise decreases. It also requires more power to stir the mixture. Eventually the mixture becomes impossible to stir.

Reason 1, above, cannot be overcome. However, the accumulation of inorganic materials is slow. In a typical household, about 1 Kg/day of garbage is produced, including about 40 g/day of inorganic materials. So, accumulation of the inorganic composition during six (6) months (the desired lifetime of the sawdust) is about 7 kg. This accumulation is not so great that it becomes a main cause of shortened lifetime of the sawdust.

Reason 2, above, can be overcome by reducing and adjusting the stirring speed and/or stirring time.

Regarding reason 3, water accumulation is 800 g/day. If such amount of water is evaporated and diffused by only air flow, airflow of 100 l/min is required. However, it is difficult to obtain such an air flow rate. Consequently, the most significant reason for a short lifetime of the sawdust is accumulation of water.

When a lot of water accumulates in the mixture, the mixture becomes clay-like and forms into a ball when stirred. Air cannot be forced into the mixture. Aerobic microorganisms in the interior of the ball cannot decompose garbage in the mixture. In this condition, anaerobic microorganisms breed, become active and generate HS gas which causes the kitchen to smell bad. Furthermore, increased power is required to stir the mixture. Especially, when the sawdust breaks into pieces.

On the other hand, when garbage supplying stops or the amount of garbage supplied per day decreases, water contained in the mixture decreases, and the mixture becomes dry. In this condition, microorganisms living in the mixture become inactive, and their decomposing ability decreases.

Additionally, the sawdust tends to break into pieces. Powdered sawdust broken into pieces scatters around the garbage disposal. The scattering is not sanitary because the powdered sawdust includes microorganisms and mold spores.

In the known garbage disposal, tank temperature is controlled. However, the water content of the mixture is not controlled.

SUMMARY OF THE INVENTION

It is an object of the invention to provide an improved garbage disposal to decompose garbage using microorganisms.

It is another object of the invention to improve the ability of the microorganisms to decompose the garbage.

It is a further object of the invention to lengthen the lifetime of the media for microorganisms.

It is a further object of the invention to provide an improved water content sensor for detecting the water content of the mixture in the tank.

To achieve the above objects, the present invention provides an improved garbage disposal having a tank containing a mixture of garbage, microorganisms and a medium for the microorganisms, stirring means for stirring the mixture in the tank, and control means for controlling the water content of the mixture.

The present invention also provides an improved water content sensor for detecting water content of a mixture in the tank. The water content sensor utilizes a temperature sensor for detecting the temperature of the mixture, heating means for heating the mixture, heat control means for controlling the heating means, detecting means for detecting a temperature response of the mixture over a predetermined time interval, and deciding means for deciding the water content percentage of the content based on the temperature response.

There is further provided a method for controlling a garbage disposal for decomposing garbage using microorganisms including the steps of: making a mixture of garbage, microorganisms and media for the microorganisms, and controlling the water content of the mixture.

BRIEF DESCRIPTION OF THE DRAWINGS

In the accompanying drawings;

FIGS. 6(a) to 6(d) are flow charts for controlling the garbage disposal;

FIGS. 28(a) to (e), 29(a) to (e) and 30(a) to (e) are time charts explaining control operation of the garbage disposal.

DETAILED DESCRIPTION OF PREFERRED EMBODIMENT

An embodiment of the present invention will be explained with reference to the accompanying drawings.

Figure 1:
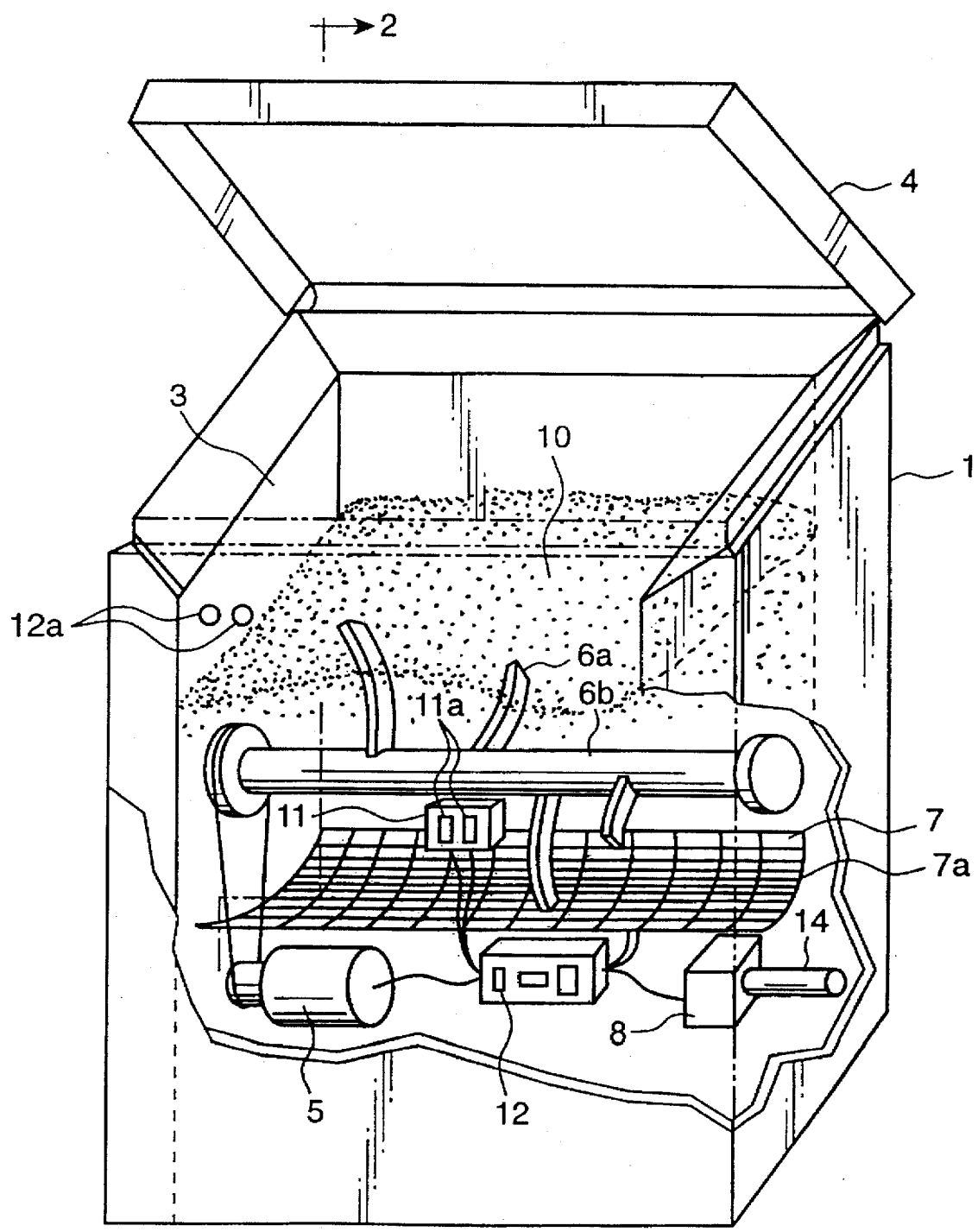
FIG. 1 is a schematic perspective view of a garbage disposal according to the present invention.
Figure 2:
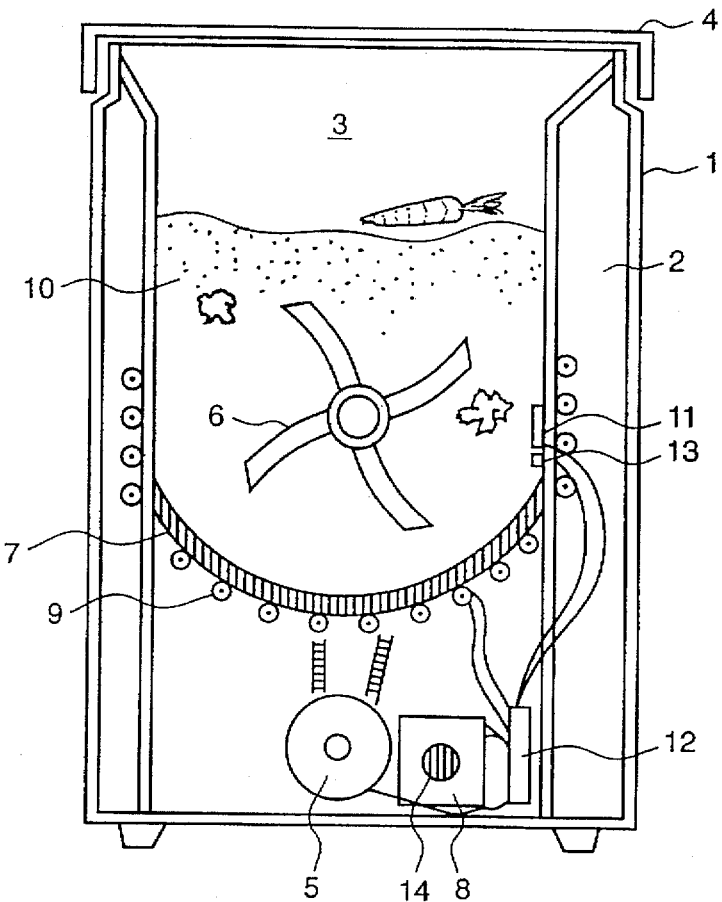
FIG. 2 is a cross-sectional view of the garbage disposal taken along the 2—2 line in FIG. 1.

FIGS. 1 and 2 show a garbage disposal according to the present invention. The garbage disposal has a casing 1. A tank 3 having about 40 l (liters) volume is installed in casing 1. Tank 3 contains mixture 10 of garbage and sawdust and microorganisms. In this embodiment, the microorganisms used are called "bacillus subtilis BN1001" made by Meiji Seika Corporation (a food company in Japan) which is described in Japanese Kokai laid open No. 3-236771 (22. Oct., 1991). This bacteria is sold in Japan under Tradename "BN Clean". However, other aerobic microorganisms which decompose organic material can be used.

Between casing 1 and tank 3, there is an insulating layer 2. A cover 4 to open and shut tank 3 is supported by casing 1. Stirring rods 6a to stir mixture 10 in the tank 3 are provided at the center of tank 3 and extended outwardly from a rotational axis 6b, supported at both ends by casing 1. At one end of rotational axis 6b there is a pulley connected with a stirring motor 5 by a belt. Stirring motor 5 can be either a variable or fixed speed motor. If the rotation speed of the stirring rods 6a is to be controlled, stirring motor 5 is advantageously selected to be a variable speed motor. An air duct opening 7 is provided at a bottom of the tank 3. The opening 7 is covered with a fine mesh 7a to prevent mixture 10 from passing through while allowing air to pass through. Opening 7 is connected with a bottom space of the garbage disposal. Stirring motor 5 and an air pump 8 are installed in a bottom space of the garbage disposal.

Figure 3:
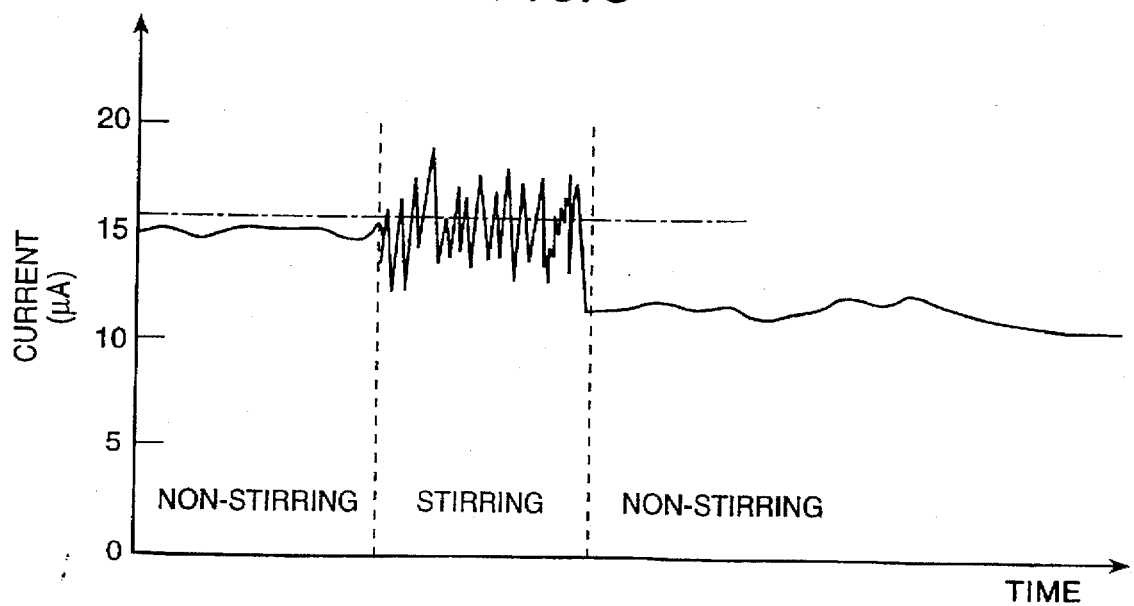
FIG. 3 is a time chart of current passing through the mixture in a tank of the garbage disposal and an operation of stirring the mixture.

Air pump 8, which supplies air via opening 7 to tank 3 uses a variable speed motor so that the volume of air blown by the air pump can be controlled. A heater 9 to heat mixture 10 in order to activate the microorganisms is attached at an outer surface of fine mesh 7a. The heating power of heater 9 is controlled in accordance with electrical power provided to it. A water content sensor 11 has two terminals 11a touching mixture 10. Water content sensor 11 detects changes of electric current passing through terminals 11a and calculates a water content percentage of mixture 10 on the basis of detected current. Water content sensor 11 reads current value passing through terminals 11a, when stirring motor 5 is energizing or stirring rods 6a are moving as shown in FIG. 3, and calculates an average value of current, then decides the water content percentage WP of mixture 10 in accordance with the average current value. Each terminal 11a is attached having a space at the inside surface of tank 3. A controller 12 controls motor 5, air pump 8 and heater 9 in accordance with water content percentage WP as detected by water content sensor 11.

A mixture temperature sensor 13, thermistor or thermocouple, detecting mixture temperature Tm is mounted at a side surface of tank 3. Two alarm lamps 12a are provided on a front side of casing 1. Lamps 12a display dry and wet conditions respectively in accordance with output of the controller 12. One example of current measurement is shown in FIG. 3. In this example, the average current read by the water content sensor 11 is 16 μA. In this application, water content percentage WP is defined by the weight of water in the mixture 10 divided by the weight of the mixture 10 and multiplied by 100 as in formula (1), below.

$$WP(\%) = \frac{\text{weight of water included in the mixture (gram)}}{\text{weight of the mixture (gram)}} \times 100 \quad (1)$$

Figure 4:
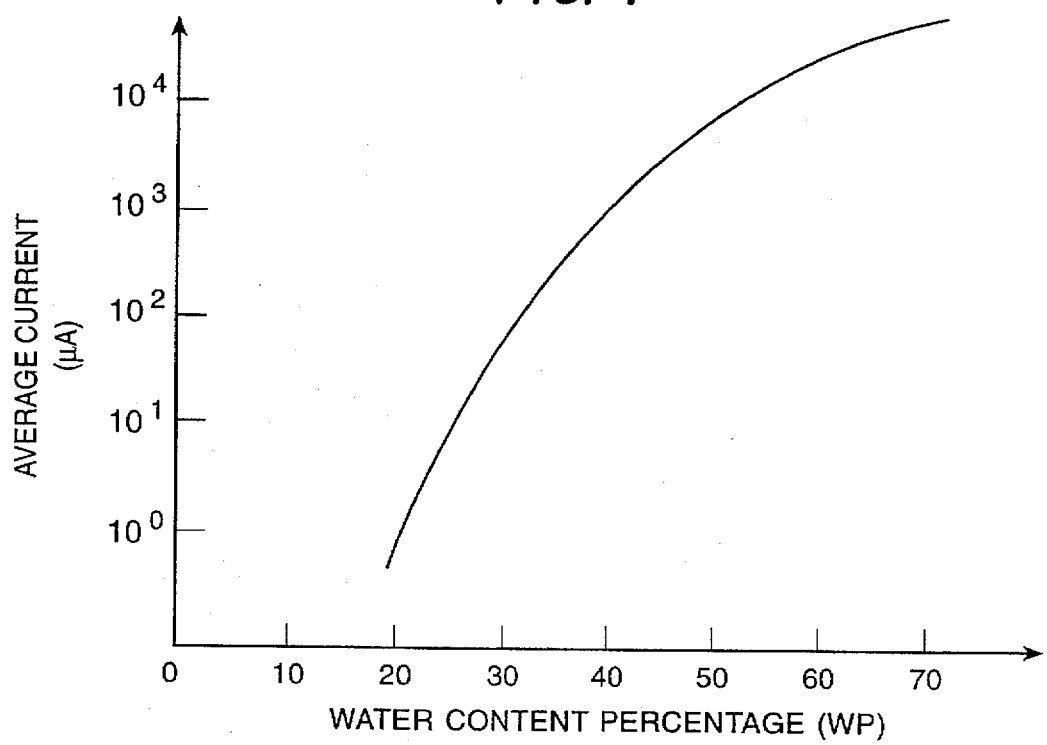
FIG. 4 is a graph showing the relationship between water content percentage and average current value detected by the water content sensor.

The relationship between water content percentage WP and average current value is shown in FIG. 4. Average current value is exponentially proportional to water content percentage WP. Accordingly, it is possible to calculate the water content percentage WP on the basis of average current.

Figure 5:
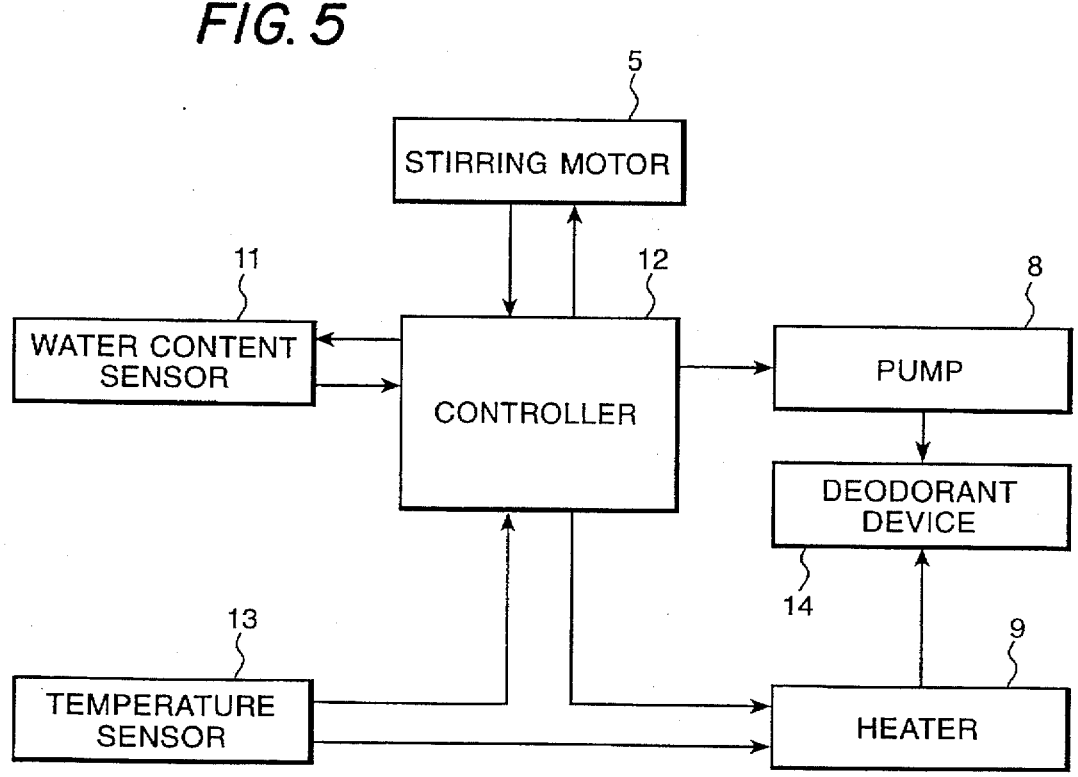
FIG. 5 is a block diagram of a controlling circuit for the garbage disposal.
Figure 6A:
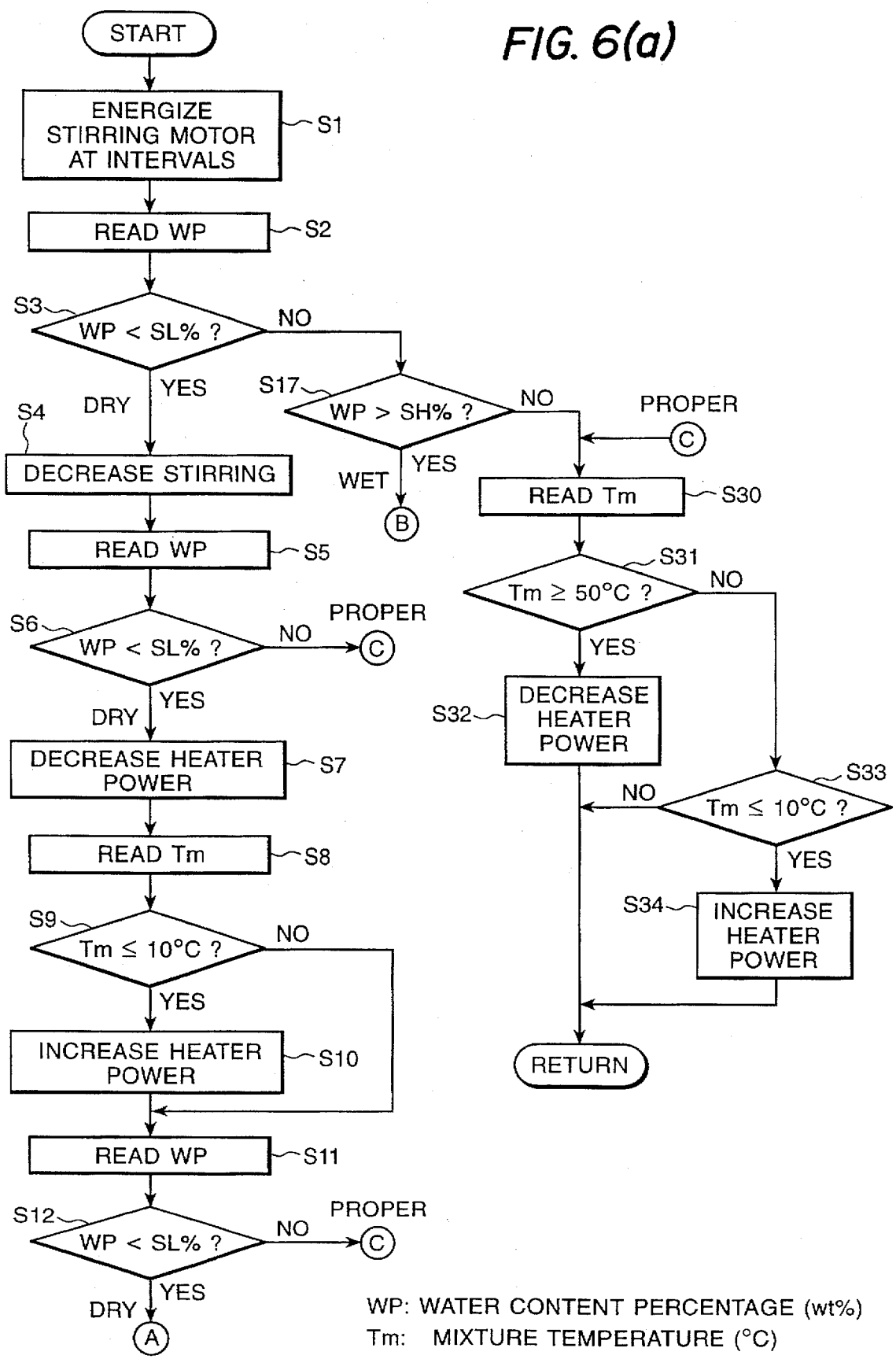

FIG. 5 is a block diagram of a control circuit of the garbage disposal. The outputs of water content sensor 11 and mixture temperature sensor 13 are input to controller 12. Controller 12 outputs control signals to stirring motor 5, air pump 8 and heater 9. The control signals to air pump 8 and heater 9 are passed along to a deodorant device 14 connected to an exhaust of air pump 8. Controller 12 reads mixture temperature Tm and water content percentage WP, then controls energizing of stirring motor 5, air pump 8, heater 9 and deodorant device 14. When stirring motor 5 or air pump 8 is energized, deodorant device 14 is energized by controller 12. Deodorant device 14 includes an ozone deodorant device or a heat oxidation catalyzer deodorant device.

Referring now to FIGS. 6(a) to 6(d), the controlling operation of controller 12 will be explained. In a step S1, stirring motor 5 is energized at predetermined intervals. At the same time, controller 12 turns on water content sensor 11. Water content sensor 11 detects the current value passing through terminals 11a, then calculates the average value of the current during the time that stirring motor 5 is operated. After that, water content sensor 11 calculates water content percentage WP in accordance with the detected average current value and outputs water content percentage WP. Controller 12 reads output water content percentage WP from water content sensor 11 (Step S2). Controller 12 classifies a condition of the mixture 10 into one of three possible conditions: dry condition, proper condition, and wet condition, in accordance with water content percentage WP. To classify, the water content percentage WP is compared with a low water content level SL (step S3). If water content percentage WP is less than SL, mixture 10 is considered to be in the dry condition, so controller 12 prevents mixture 10 from further drying in the following steps. In step S4, stirring is reduced. It is possible to reduce by any of the following actions: shortening operation time of stirring, decreasing the rotation speed of stirring motor 5, and increasing the stopping time of stirring motor 5, or any combination of these. In this embodiment we increase the stopping time (the duty of stirring motor 5 is decreased).

A predetermined time after stirring is reduced, controller 12 reads water content percentage WP detected by water content sensor 11 (step S5), and controller 12 compares water content percentage WP with SL again (step S6). If water content percentage WP is proper, the flow goes to step S30 (step S6). On the other hand, if water content percentage WP is still less than SL in the step S6, the condition of mixture 10 is still dry, electrical power of the heater 9 is decreased (step S7). Then, mixture temperature Tm is read by controller 12 (step S8). mixture temperature Tm is compared with 10° C. (step S9). If Tm is less than 10° C., the electrical power of heater 9 is increased (step S10). Mixture temperature Tm should be kept more then 10° C. in order to activate microorganisms living in the mixture 10. If mixture temperature Tm is more than 10° C. in step S9 or after step S10, water content percentage WP is read (step S11), and water content percentage WP is compared with SL % again (step S12). If water content percentage WP is more than SL, the flow returns to step S30. If water content percentage WP is less than SL in the step S12, the condition of mixture 10 is still considered to be dry. Air volume blown by the air pump 8 is decreased (step S13). At a predetermined time after decreasing the air volume, water content percentage WP is read (step S14), and compared with SL (step S15). If water content percentage WP is more than SL, the condition of mixture 10 is improved, flow returns to step S30. If water content percentage WP is less than SL, controller 12 energizes lamp 12a to display an alarm indicating a dry condition (step S16). Accordingly, a user can recognize that mixture 10 is dry and can put water into tank 3.

If water content percentage WP is more than SL in step S3, then in. In step S17, water content percentage WP is compared with a high water content level SH (%). If water content percentage WP is less than SH, the condition of the mixture 10 is proper and the flow goes to step S30. If water content percentage WP is more than SH, the condition is wet and bad for decomposing. So the wet condition of mixture 10 is improved by the following steps.

In step S18, the air volume blown by air pump 8 is increased. At a predetermined time after increasing the air volume, water content percentage WP is read (step S19). If the wet condition is improved by increasing the air volume and water content percentage WP is decreased under SH, mixture 10 is in a proper condition, and the flow goes to step S30. If water content percentage WP is more than SH, the condition is still wet. The power of heater 9 is increased in order to dry the mixture 10 (step S21). However, the microorganisms do not work well at high temperatures. Accordingly, mixture temperature Tm is read at step S22. Then, in step S23, if mixture temperature Tm is greater or equal to 50° C., the power of heater 9 is decreased, or the power of heater 9 becomes a value which is the same as before increasing in step S21 (step S24). As a result of steps S23 and S24, mixture temperature Tm is kept less then 50° C., so that the decomposing ability of the microorganisms is kept high. After step S24, water content percentage WP is read (step S25). Then water content percentage WP is compared with SH again (step S26). If water content percentage WP is less than SH, the flow goes to step S30. If water content percentage WP is more than SH, mixture 10 is considered to still be wet and stirring is increased (step S26). In step S26, there are various ways to increase stirring. In this embodiment, we decrease the stop time of stirring motor 5 (the duty of stirring motor 5 is increased).

A predetermined time after increasing stirring, the water content percentage WP is read (step S27), and water content percentage WP is compared with SH (step S28). If water content percentage WP is proper, the control goes to step S30. On the other hand, if water content percentage WP is more than SH in step S28, mixture 10 is still considered to be wet. In the following step S29, controller 12 energizes the lamp 12a to display an alarm indicating a wet condition. Accordingly, a user can recognize that mixture 10 is wet by the indication of lamp 12a, and can exchange mixture 10 in the tank 3.

When the water content percentage of mixture 10 is proper (between SH and SL), mixture temperature Tm is read (step S30), mixture temperature Tm is compared with a predetermined temperature, such as, for example, 50° C. (step S31). If mixture temperature Tm is greater than or equal to 50° C., the power of heater 9 is decreased (step S33). If mixture temperature Tm is less than 50° C., mixture temperature Tm is compared with another predetermined temperature, such as, for example, 10° C. (step S33). If mixture temperature Tm is less than or equal to 10° C., the power of heater 9 is increased (step S34). When mixture temperature Tm is between 10°C. and 50° C. after steps S32 or S34, the control returns to step S1. Accordingly, the mixture temperature Tm is maintained between 10° C. and 50° C. in order to activate the microorganisms at the proper water content and temperature condition.

When water content percentage WP is high, air pump 8, heater 9, and stirring motor 5 are controlled in this order, while when water content percentage WP is low, stirring motor 5, heater 9 and air pump 8 are controlled in this order. In this manner, the frequency of stirring is minimized and the sawdust is prevented from breaking into pieces.

Figure 7A:
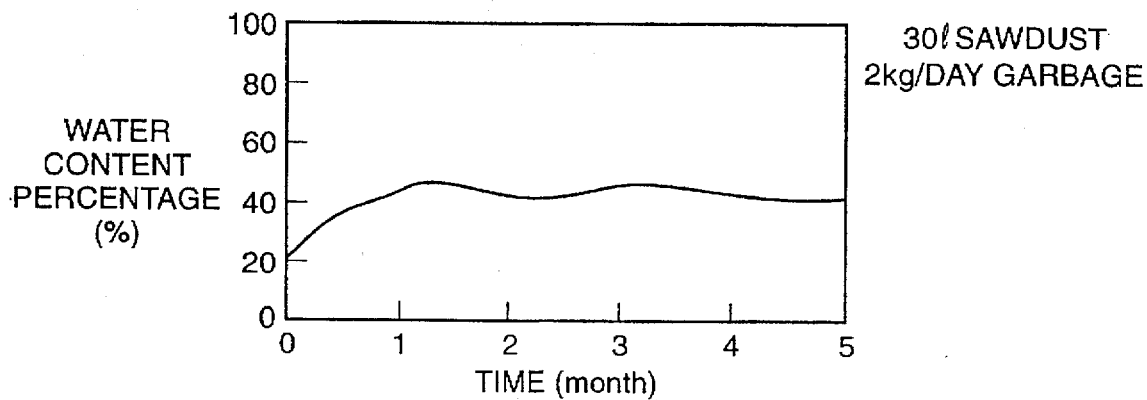
FIGS. 7(a) to 7(d) are charts showing, as a function of time, the number of microorganisms and operation of the garbage disposal when 2 kg/day garbage is supplied to the garbage disposal.
Figure 7B:
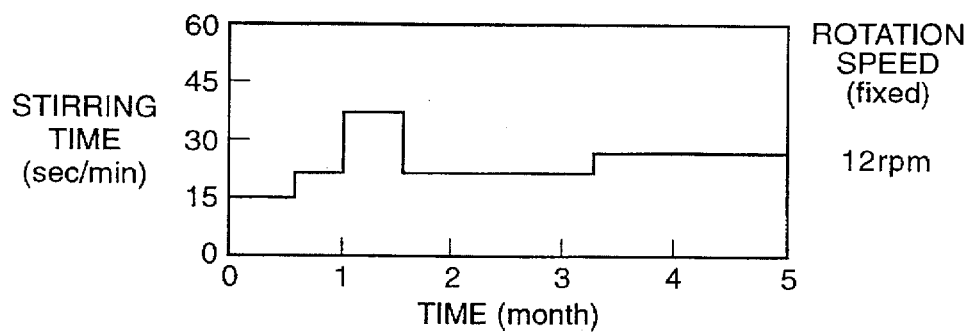
Figure 7C:
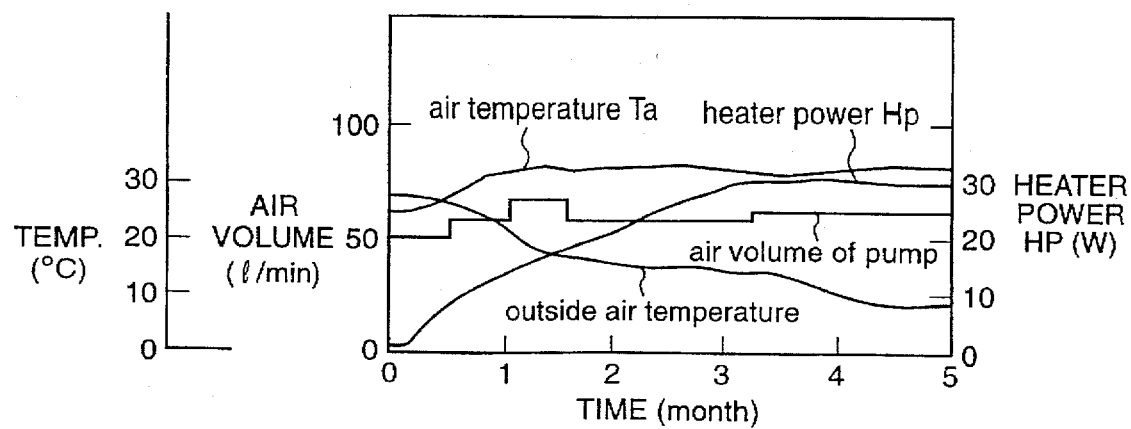
Figure 7D:
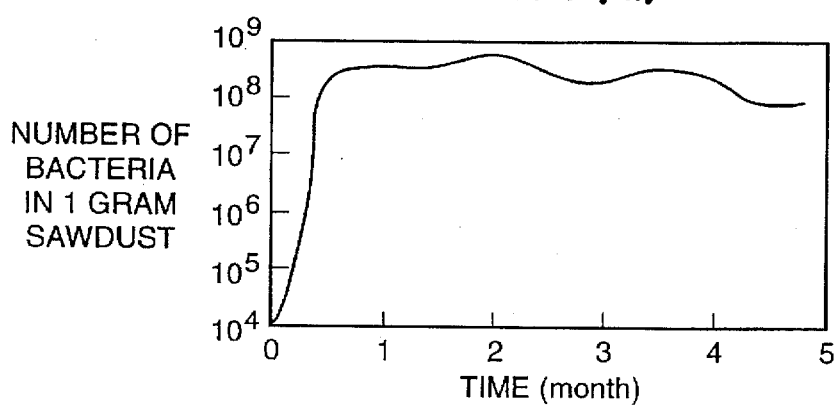

Referring now to flow chart of FIGS. 7(a) to 7(d), the operations of stirring motor 5, heater 9 and air pump 8 and water content percentage WP will be explained. FIGS. 7(a) to 7(d) show an example wherein there is a slightly heavy loaded condition for the garbage disposal. In this case, 30 l sawdust and microorganisms are put into tank 3 at first, then garbage of 2 kg is put into tank 3 everyday. Water included in the garbage is accumulated in the mixture 10 at first. However, the water accumulation is detected by water content sensor 11. When the water content percentage WP of mixture 10 is more than a predetermined high water content level SH, controller 12 controls air pump 8, heater 9 and stirring motor 5 to reduce the amount of water in mixture 10. During the first half month of operation, the water content percentage WP reaches 30%, the air flow volume is increased, then the power of heater 9 is increased. After that the stirring duty (stirring time/stopping time) is increased. The rotational speed of stirring motor 5, is fixed at 12 rpm, so controller 12 controls the stirring duty of stirring motor 5. After one month, as shown in FIG. 7(a), the water content percentage WP is decreased as a result of such control. At about one half month after control starts, the water content percentage WP drops under lower water content level SL. This condition is not shown in FIG. 7(a) because FIG. 7(a) plots an average water content percentage each day, so the stirring duty and air volume are decreased (FIG. 7(c)). From the second to the third month, water content percentage WP is continuously and slightly increasing, so the heater power HP is continuously increased, and at three and one half months, the air volume and stirring duty are increased. During the fifth month of operation after the start shown in FIGS. 7(a) to 7(c), heating power HP is changed in accordance with water content percentage WP, keeping the mixture temperature Tm, or the air temperature Ta entering into the tank 3, less than 50° C. As referred to FIGS. 7(a) and 7(d), water content percentage WP is stable at about 40% through 5 months and the number of microorganisms in mixture 10 is more than $10^8$ bacteria/1 gram sawdust which is a good condition.

In this condition, the decomposing ability of the microorganisms is high. Accordingly, the volume of sawdust can be reduced. Therefore, it is possible to reduce the size of the tank and the casing 1 of the garbage disposal. An average weight of garbage in an ordinary house is 1 kg/day, accordingly, sawdust between 10 l and 20 l is sufficient for the ordinary house.

Figure 8A:
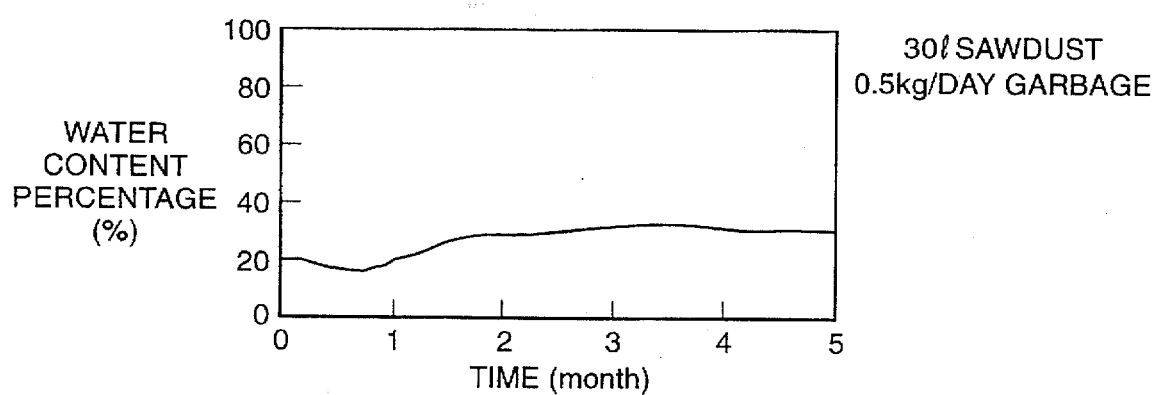
FIG. 8(a) to FIG. 8(d) are charts, showing as a function of time, the number of microorganisms and controlling operation of the garbage disposal when 0.5 kg/day garbage is supplied to the garbage disposal.
Figure 8B:
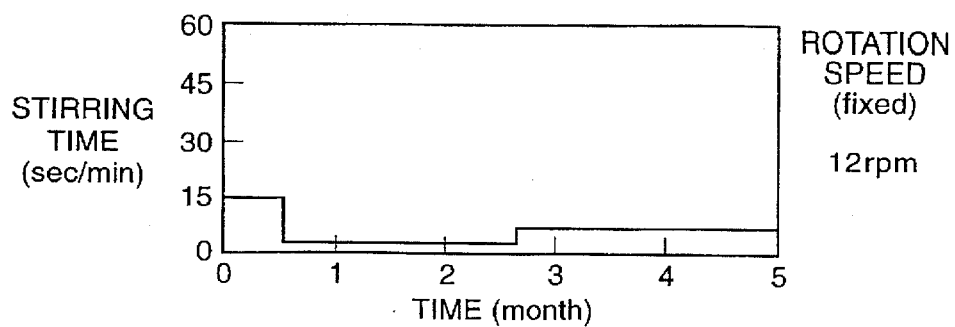
Figure 8C:
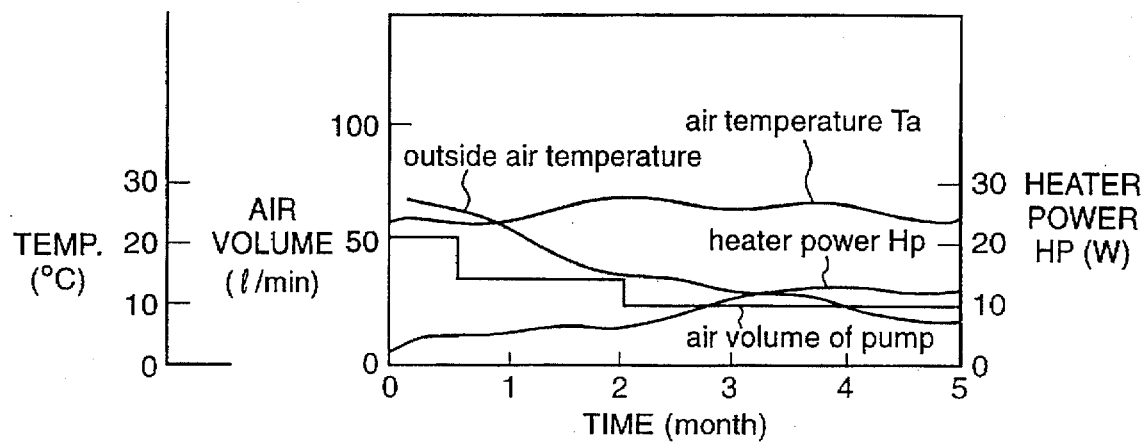

FIGS. 8(a) to 8(d) show an example of a lightly loaded condition for the garbage disposal. In this case, sawdust of 30 l and microorganisms are put into the tank at first. Then garbage of 0.5 kg is put into the tank everyday. Water accumulated in the mixture 10 is quickly evaporated and diffused, making the mixture 10 dry. The controller 12 decreases stirring duty and/or heater power HP and/or air volume, when water content percentage WP is lower than the low water content level SL. Referring to FIG. 8(a), the water content percentage WP is kept between 20% and 30% through five months. In the graph set forth in FIG. 8(c), the power of the heater is changed mainly in accordance with mixture temperature Tm in steps S32 and S34. During the fifth month after start, air temperature Ta (temperature of air entering into the tank) is decreasing. Therefore, mixture temperature Tm is decreasing. Thus, the power of the heater is gradually increasing to maintain the air temperature Ta at more than 10° C.

In this case, the number of the microorganisms in the mixture 10 is more than $10^6$ bacteria/1 gram sawdust. During the fifth month after start, the water content percentage WP is maintained greater than 20% to prevent scattering of small pieces of sawdust. Accordingly, the area around the garbage disposal is kept clean and sanitary. When the mixture 10 is determined to be dry, controller 12 initially decreases "on" time of the stirring duty cycle to prevent the sawdust from being broken into pieces. Accordingly, the lifetime of the sawdust is extended.

FIGS. 9(a) to 9(d) show the condition of the mixture 10 and the controlling operation wherein water content of the mixture 10 is not controlled in order to compare with the present invention. In this case, the stirring duty, the rotation speed of the stirring rods and air volume are fixed. Only heater power HP is controlled to keep the mixture temperature Tm at about 30° C. The volume of the sawdust put into the tank is 30 l, the same as in FIGS. 7(a) to 8(d).

Figure 9A:
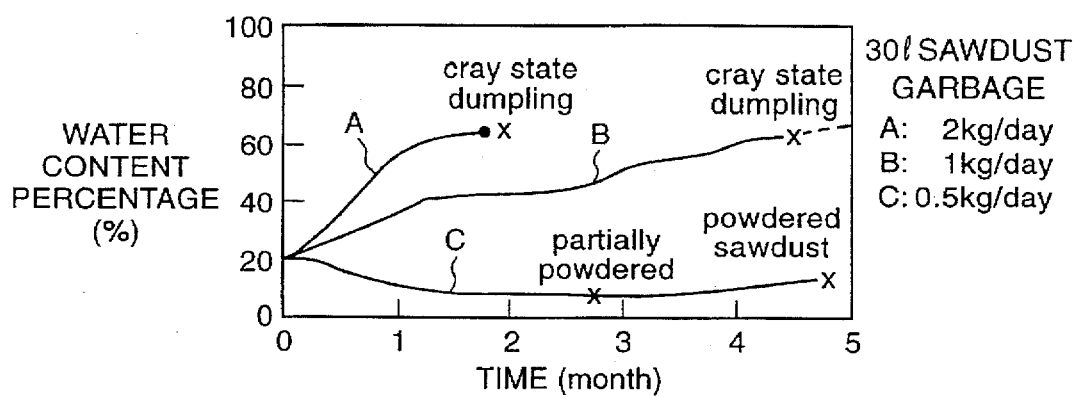
FIG. 9(a) to FIG. 9(d) are charts showing, as a function of time, change of water content percentage, stirring intervals, temperature of mixture, volume of airflow, power of heater, number of microorganisms in tank, these charts corresponding with those shown in FIGS. 7(a) to 8(d)
Figure 9B:
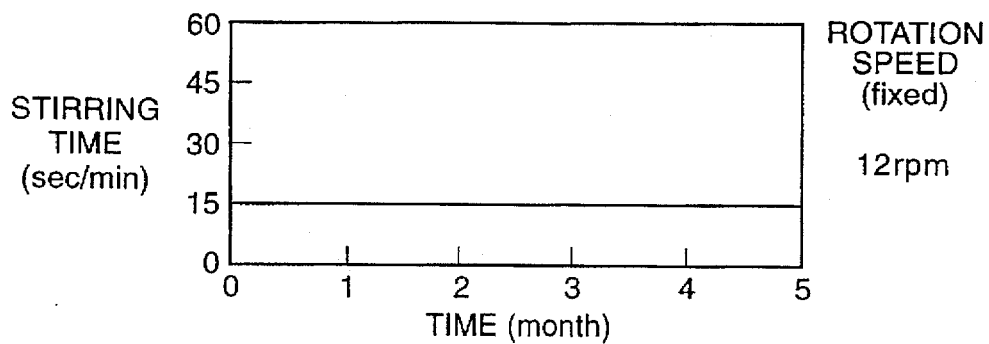
Figure 9C:
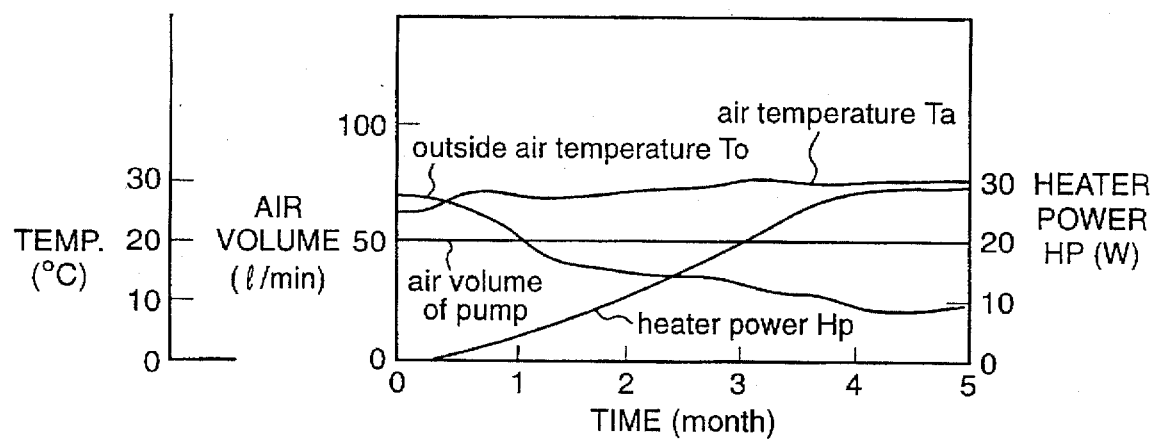
Figure 9D:
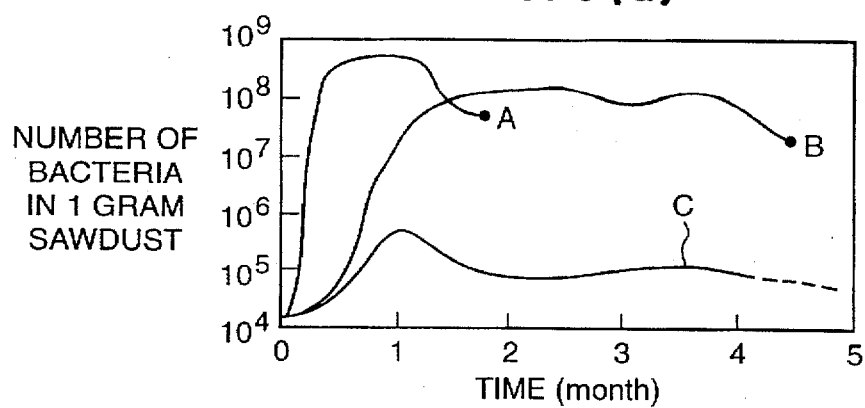

In a first case, garbage is put into the tank at a rate of 2 kg/day, as shown by line A of FIGS. 9(a) and 9(d). At about 2 months from the start of operation, the mixture 10 forms into a ball, and the number of microorganisms decreases. This effectively ends the lifetime of the sawdust after only two months.

In a second case, garbage is put into the tank at a rate of 1 kg/day, as shown by line B of FIGS. 9(a) and 9(d). In this case, evaporation of water from the mixture 10 is somewhat inefficient. The accumulation of water slowly increases. The mixture 10 consequently forms into a ball at four and one half months from the start of operation.

Figure 8D:
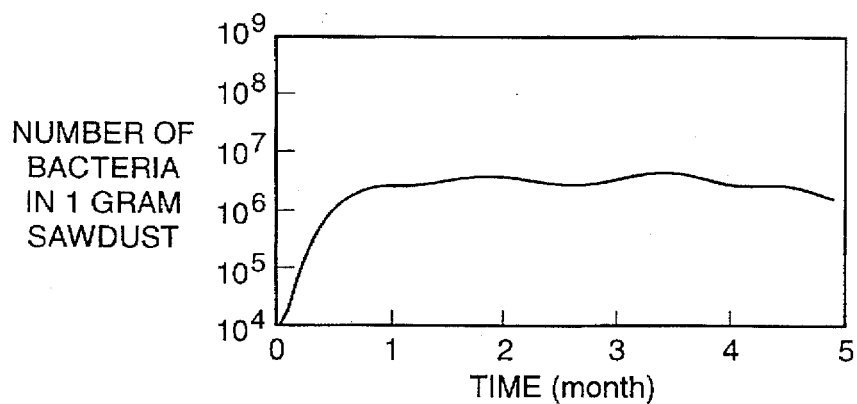

In a third case, garbage is put into the tank at a rate of 0.5 kg/day, as shown by line C of FIGS. 9(a) and 9(d). In this case, the fixed stirring duty is too much for keeping the mixture 10 a proper condition. As shown in FIG. 8(d), the mixture 10 becomes dry, and powdered sawdust, broken by stirring, scatters around the garbage disposal. The powdered sawdust includes microorganisms and mold spores. Further, the microorganisms in the mixture 10 do not breed. The number of microorganisms is less than $10^5$ bacteria/1 gram sawdust. Accordingly, decomposition of the microorganisms is inefficient.

In almost all cases, when the water content of the mixture is not controlled, the lifetime of the sawdust is shorter than six months.

The relation between the water content percentage of the mixture 10 and the condition of mixture 10 is shown in Table 1.

TABLE 1

| water content percentage | condition of mixture 10 |
| --- | --- |
| 0 to 10% | hard dry condition; decomposing ability of microorganisms is reduced, and become spore; powdered sawdust is scattered when sawdust breaks into pieces |
| 10 to 20% | rather dry condition; powdered sawdust is scattered when sawdust breaks into pieces |
| 20 to 40% | proper condition; decomposing ability of microorganisms is sufficient; hardly any scattering sawdust |

TABLE 1-continued

| water content percentage | condition of mixture 10 |
|---|---|
| 40 to 60% | partially wet; decomposing ability of microorganisms is sufficient; stirring torque increases |
| more than 60% | wet condition; clay state; mixture 10 forms a ball; air passing through mixture 10 decreases; decomposing ability decreases; a stink is generated by anaerobic mixture; sometimes water drops from the tank |

Decomposing ability is defined as weight of decomposed organic composition divided by weight of organic composition put into the tank. When the water content percentage WP is under 10%, the decomposing ability is less than 70% of maximum. This is too inefficient for home use. On the other hand, when the water content percentage WP is 60% or more, the decomposing ability is also less than 70% of maximum. Consequently, the desired water content percentage WP is 10–60%.

Figure 12:
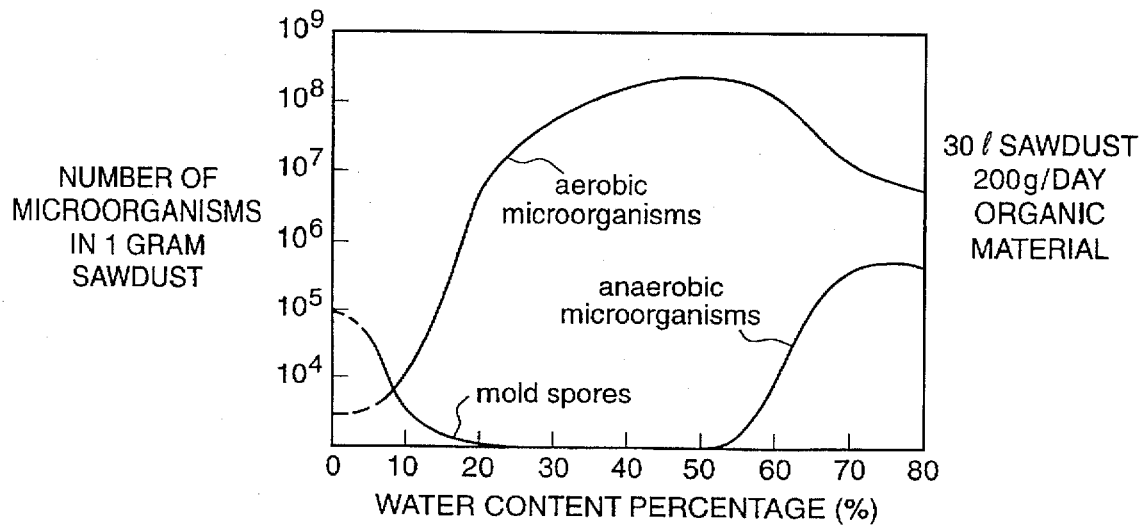
FIG. 12 is a graph relating the number of microorganisms in the mixture with water content percentage.

FIG. 12 shows the number of microorganisms in one gram of sawdust and water content percentage WP, when 200 g/day of organic composition, dextrin and peptone, and water to keep the water content percentage WP constant are put into the tank every day.

When the water content percentage WP is less than 20%, the microorganisms become spores and the number of aerobic microorganisms rapidly decreases. When the water content percentage WP is 60% or more, the number of aerobic microorganisms slowly decreases, although, the number of anaerobic microorganisms rapidly increases. It is recognized that the interior of the mixture 10 presents an anaerobic condition when the water content percentage WP is more than 60% even when the mixture 10 is stirred. Accordingly, it is preferable to maintain the water content percentage WP of 10–60%, and even better to maintain it from 20–60%.

Figure 14:
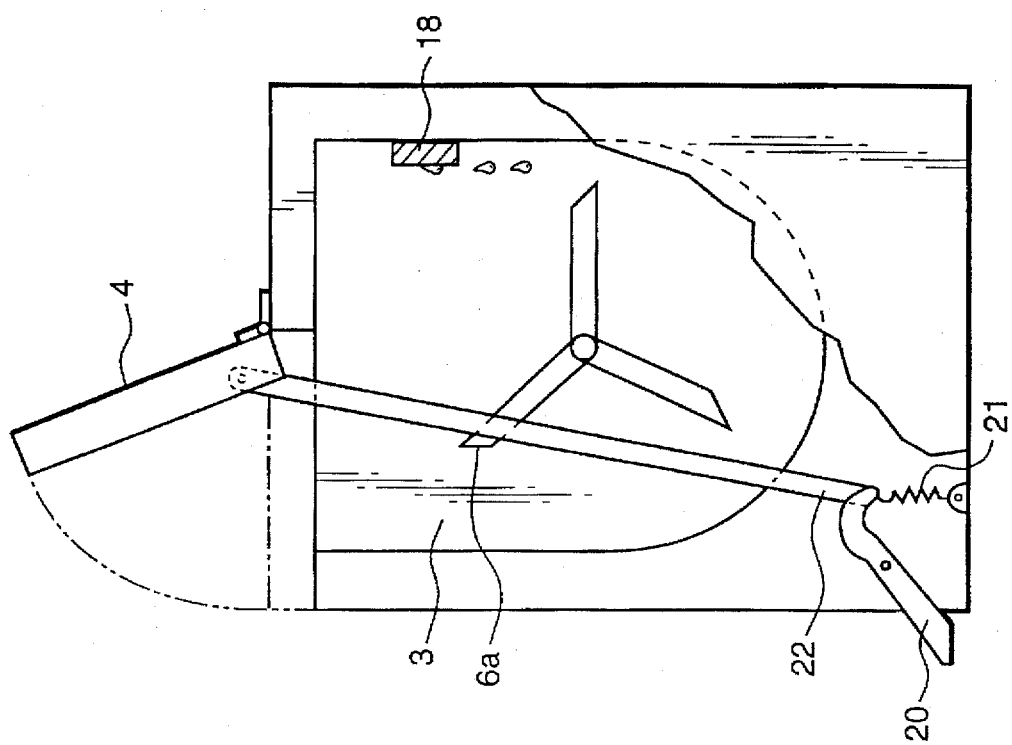
FIG. 14 is a schematic cross-sectional view of a garbage disposal having electronic refrigerator for supplying water to the mixture.
Figure 13:
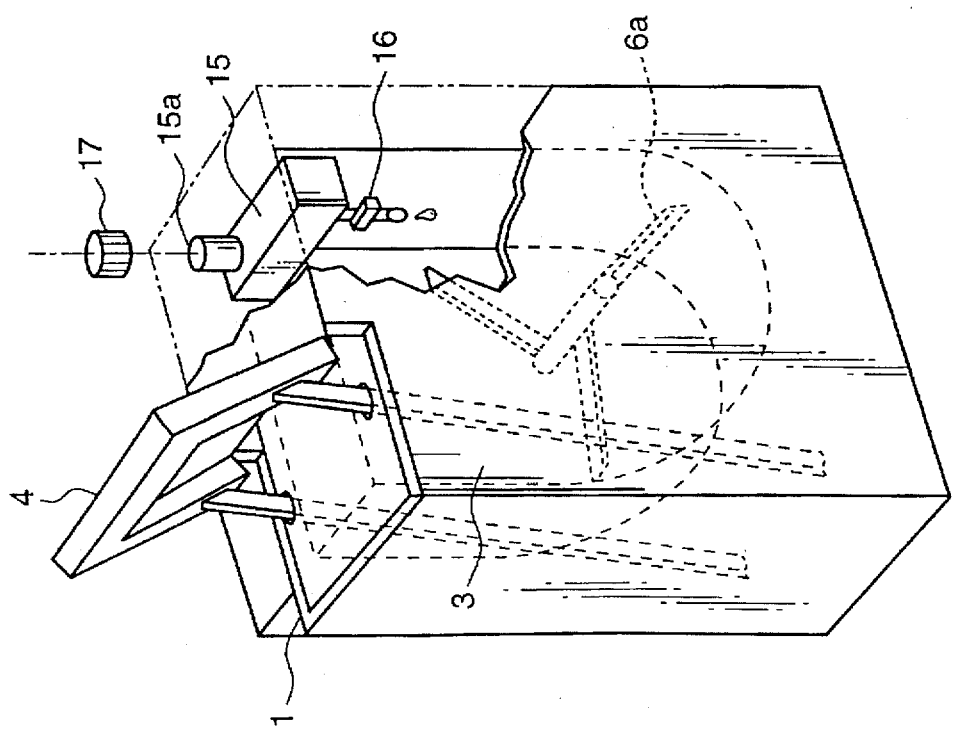
FIG. 13 is a schematic perspective view of a garbage disposal having a water tank for supplying water to the mixture.

Referring now to FIG. 13 and FIG. 14, there is shown another embodiment of a garbage disposal according to the present invention. Controlling the water content percentage WP of the mixture 10 during a dry condition will be explained. In FIG. 13, the garbage disposal has a water tank 15 to supply the mixture 10 with water. Water tank 15 has an opening 15a extended to the upper side of casing 1. Opening 15a is covered by a cap 17. A valve 16, controlled by a controller of the garbage disposal, is provided at the bottom of water tank 15. The opening of tank 3 for receiving garbage is covered by a cover 4. Cover 4 is opened and closed by operating a foot pedal (not shown in FIG. 13), as in the embodiment shown in FIG. 14. Stirring rods 6a are provided in the tank 3. When the controller detects a dry condition of the mixture 10, the controller opens valve 16 and water in water tank 15 flows into tank 3.

FIG. 14 shows another embodiment of a garbage disposal which includes a different type of water supply. The garbage disposal has a thermo-electric refrigerator 18 attached to an inner wall of tank 3. When a controller of the garbage disposal detects a dry condition, the controller energizes refrigerator 18. The condensing surface of refrigerator 18 is cooled, water in the air is condensed on the condensing surface of the refrigerator 18, and the condensed water drops into the tank 3. Consequently, the water content percentage WP of mixture 10 does not fall too low. The advantage of this embodiment is that it is not necessary to periodically fill any water tank.

The garbage disposal has a pedal 20 which can be operated to open cover 4 of tank 3. When pedal 20 is pushed, a connecting rod 22 pushes upwardly. One end of connecting rod 22 is rotatably connected to cover 4, so that cover 4 is opened by connecting rod 22. After opening cover 4, when pedal 20 is no longer pushed, a spring 21 connected to the other end of connecting rod 22 pulls connecting rod 22, then cover 4, pedal 20 and connecting rod 22 return to the former state. In this embodiment, it is not necessary to open cover 4 by hand.

The relation between scattering of the microorganisms and water content percentage WP is set forth in Table 2. The number of microorganisms shown in Table 2 is estimated from microorganisms included in an exhaust of the garbage disposal. The method of counting the number of microorganisms is to catch microorganisms by an impinger provided at an exhaust of the garbage disposal and then cultivate it in an HIB (physiological salt solution added heart infusion bouillon) molding. After cultivating, the number of microorganisms exhausted is determined based on the number of microorganisms in the cultivated molding.

TABLE 2

| condition | water content percentage (weight of water/ weight of mixture 10) * 100 | exhausted number of microorganisms (bacteria/1 m$^3$) |
|---|---|---|
| dry sawdust | 15% | $1.2 * 10^7$ |
| moist sawdust | 50% | $3.0 * 10^6$ |
| ordinary air | — | $1.0 * 10^3$ |

The number of microorganisms included in the exhaust of the garbage disposal is about $10^3$ to $10^4$ times the number in ordinary air. The number of microorganisms is inversely proportional to the water content percentage WP. Accordingly, extremely dry conditions should be avoided from a sanitary point of view. Further, a mixture 10 having the proper water content percentage WP tends to compose uniformly. It is easy to dump the sawdust at the end of its useful life and the sawdust does not scatter when it is dumped.

Various types of water content sensors can be used in the garbage disposal according to the present invention.

Figure 10:
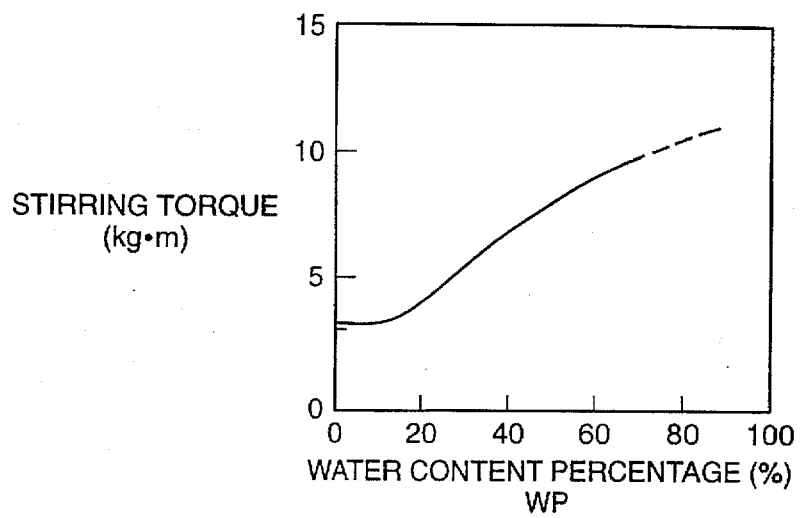
FIG. 10 is a graph showing the relationship of stirring power and water content percentage.
Figure 11:
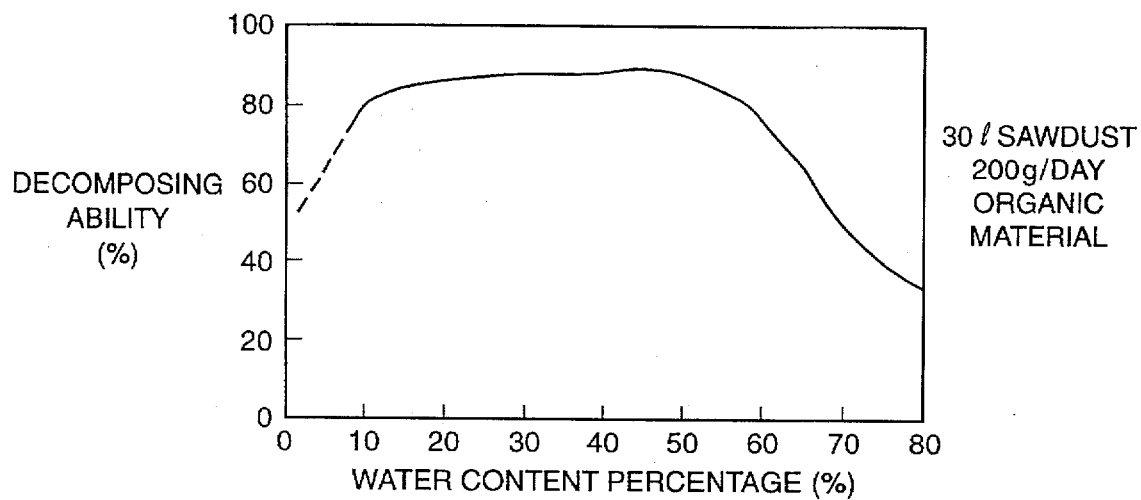
FIG. 11 is a graph showing the relationship of weight percentage of organic composition decomposed by microorganisms and water content percentage.

Referring again to FIG. 10, the torque of stirring motor 5 is proportional to water content percentage WP of the mixture 10. Accordingly, it is possible to determine the water content percentage WP from a measurement of the torque of motor 5. In this embodiment, water content sensor 11 includes a torque meter to detect the torque of the stirring motor and a converter to convert the torque detected by torque meter into water content percentage WP. The torque meter connects to shaft 6b of stirring motor 5 to detect the torque of motor 5.

An alterative water content sensor 11 includes a humidity sensor provided between the cover 4 and mixture 10 as shown in FIG. 1. The humidity sensor detects the humidity of air in the tank 3. There is a known relationship between the humidity of the air in tank 3 and the water content percentage WP of the mixture 10. The measured humidity is converted into water content percentage WP in accordance with that known relationship. The humidity sensor is highly reliable because the sensor does not need to touch the mixture 10.

Another alternative embodiment utilizes a color sensor to determine water content percentage WP. Sawdust has a light brown color when it is not wet. When it absorbs water, it changes color to dark brown. Almost all of the mixture 10 is sawdust. Thus, the color of the mixture 10 changes from light brown to dark brown in accordance with the water content percentage WP of the mixture 10. Therefore, a color sensor, more particularly, a light reflection sensor, can be used to measure water content percentage WP. The color sensor is also highly reliable because it does not need to touch the mixture 10.

Another alternative water content sensor 11 uses a weight sensor to measure the weight of the mixture 10. The more water in the mixture 10, the heavier it becomes. Tank 3 is hung in casing 1, and the weight of tank 3 including mixture 10 is measured by the weight sensor and micro switch to detect open and shut cover 4. The weight sensor measures a weight of mixture 10 at a predetermined time, for example 2 hours after the micro switch detects cover 4 being shut.

Figure 15:
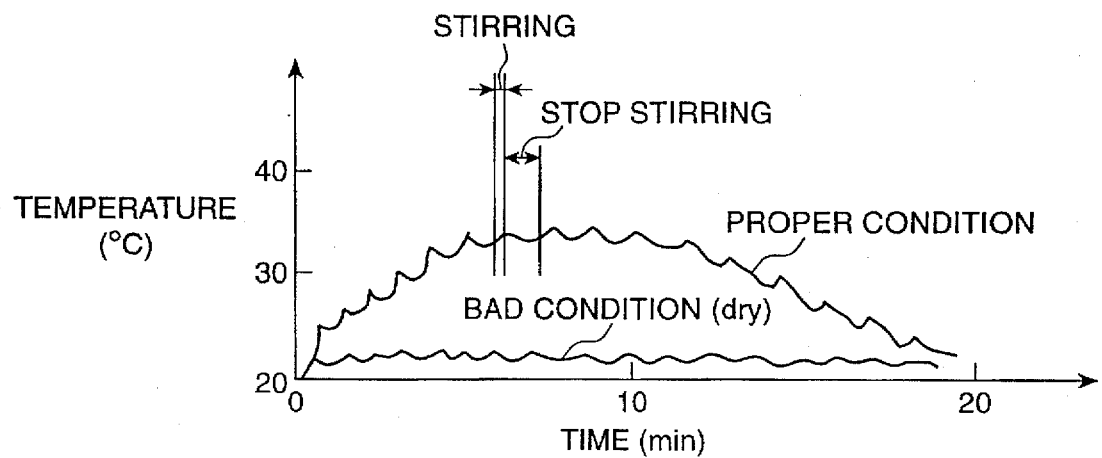
FIG. 15 is a chart showing the change of temperature of mixture over time to explain how water content percentage of the mixture is determined using a temperature sensor.

Another alternative water content sensor 11 uses only the mixture temperature sensor 13 to detect mixture temperature Tm. When conditions are good for decomposing organic material, the mixture temperature Tm increases. As shown in FIG. 15, during stirring, the temperature of the mixture 10 rapidly increases because decomposition of organic composition generates heat. During stirring, fresh air is supplied into mixture 10, so aerobic microorganisms are actively decomposing organic material in the mixture 10. Although, when dry, the temperature of the mixture 10 slightly increases during stirring. Thus, it is possible to classify as good or bad, the wet and dry, condition of the mixture 10 in accordance with the difference in mixture temperature before and after stirring. Accordingly, the water content sensor reads temperatures before and after stirring by the mixture temperature sensor, and calculates the difference of these temperatures, then decides the condition of mixture 10.

Figure 16A:
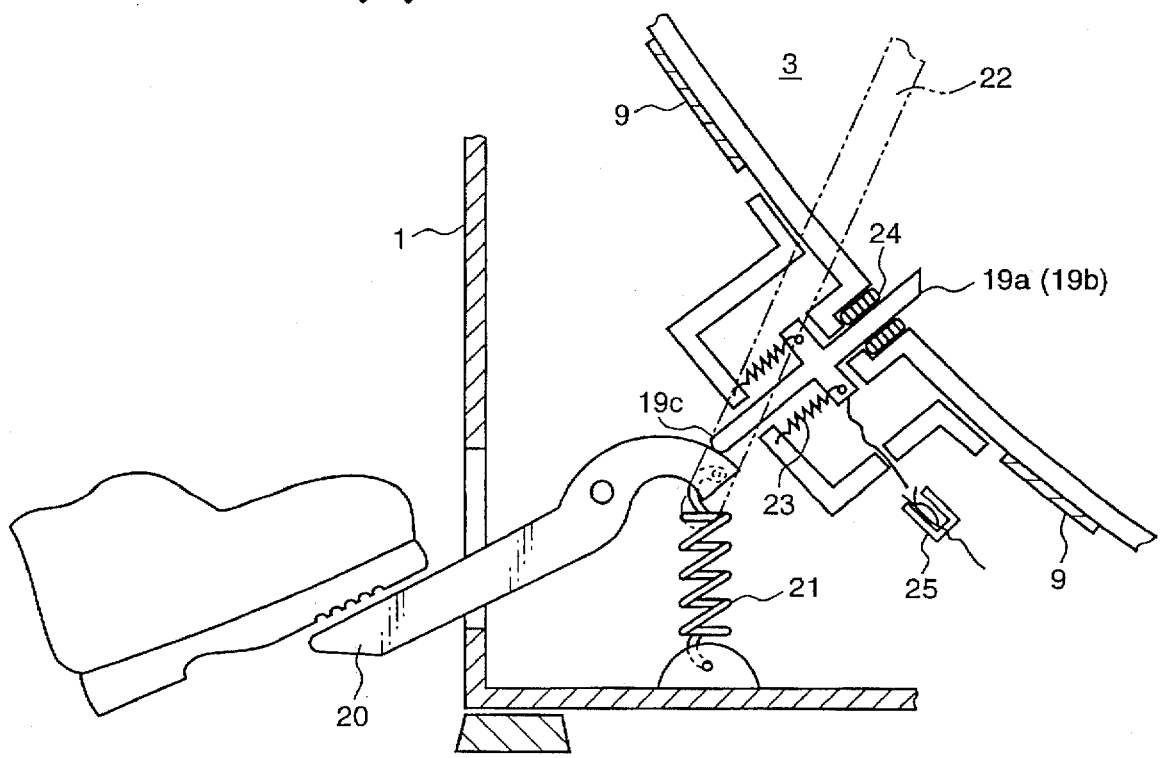
FIG. 16(a) is a cross-sectional view of a garbage disposal having an impedance sensor to detect water content percentage of the mixture.
Figure 16B:
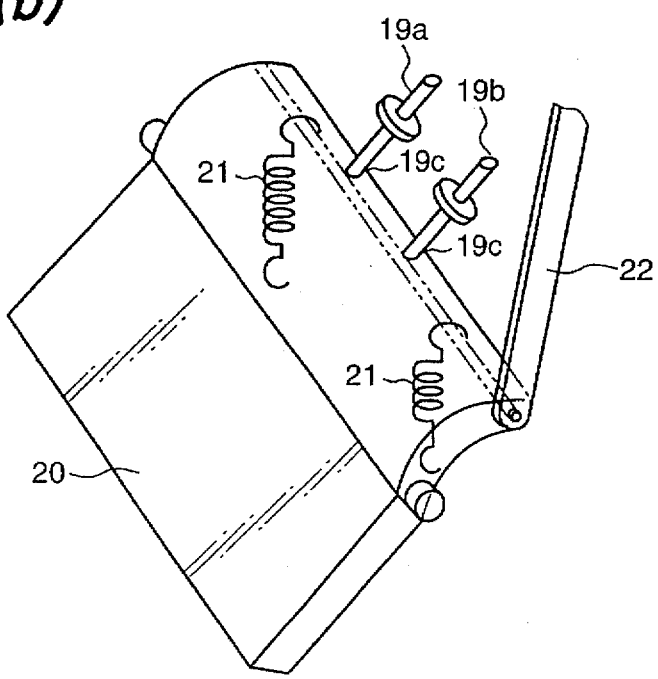
FIG. 16(b) is an enlarged perspective view of the impedance sensor used by the garbage disposal shown in FIG. 16(a)
Figure 17:
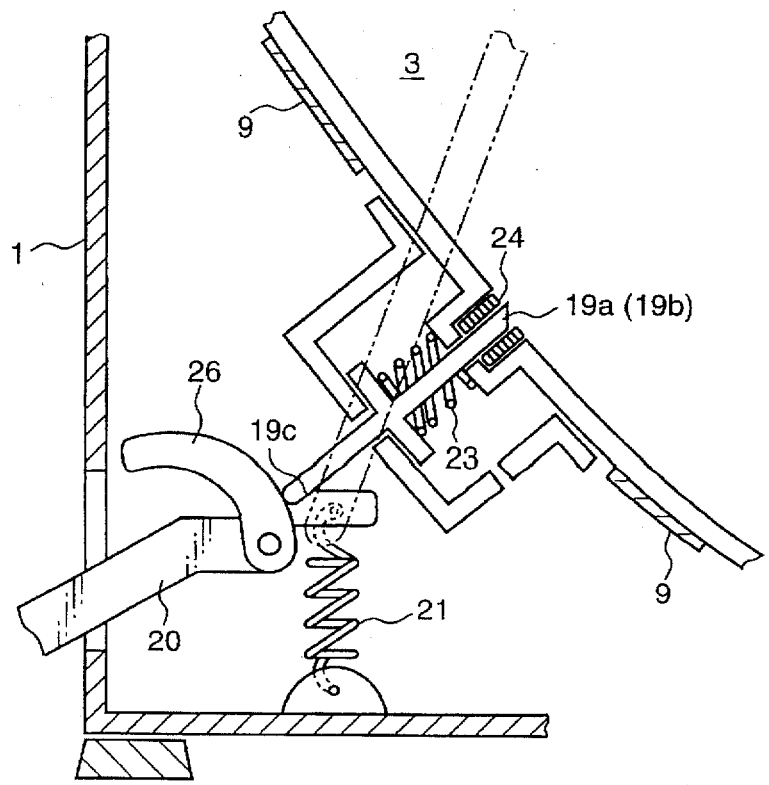
FIG. 17 is a cross-sectional view of a garbage disposal having an alternative impedance sensor to detect water content percentage of the mixture.

Referring now to FIG. 16(a) to FIG. 19, another water sensor using impedance measurement will be explained. In FIG. 16(a) and (b), a pair of terminals 19a and 19b is provided at the bottom of tank 3 to detect electrical impedance of the mixture 10. Terminals 19a and 19b are located close to heater 9. So, the electrical impedance detected between terminals 19a and 19b is not affected by outside air temperature To. When the mixture 10 become clay-like, a piece of the mixture 10 may stick to terminals 19a and 19b. The stuck mixture 10 on terminals 19a, 19b causes an error in the impedance detection. In FIGS. 16(a), 16(b) and FIG. 17, there are shown terminals 19a and 19b of impedance sensor which can remove any stuck mixture 10 therefrom.

In FIGS. 16(a), 16(b), a pedal 20 is connected to connecting rod 22 to open a cover 4 of garbage disposal and one end 19c of terminals 19a and 19b. Terminals 19a and 19b slidably move in a scraping member 24 which is tubular, and connect to a main body of impedance sensor by connector 25. When the pedal 20 is pushed downward, the ends of terminals 19a and 19b are pushed in the direction of tank 3, and terminals 19a and 19b project to tank 3 and pierce the mixture 10 in tank 3. At this moment, the impedance sensor detects impedance of mixture 10. When pedal 20 is released, pedal 20 and cover 4 are returned to their initial positions, respectively, by a spring 21. At the same time, terminals 19a and 19b are pulled down to their initial positions by terminal springs 23, and the stuck mixture 10 is removed by a scraping member 24.

FIG. 17 shows another possible construction of terminals 19a and 19b of the impedance sensor. In FIG. 17, terminal spring 23 is used as a pushing spring. Therefore, terminals 19a and 19b are always pushed downward. Although, when pedal 20 is released, pushing rod 26 pushes the end of terminal 19a and 19b upwardly, Thus, terminals 19a and 19b are projected into tank 3. When pedal 20 is pushed, pushing rod 26 rotates, and a distance between a portion of pushing rod 26 attaching to the end of terminals 19c and scraping member 24 is increased. So terminal spring 23 pulls terminals 19a and 19b downward. During this movement, terminals 19a and 19b are scraped by scraping member 24.

FIGS. 16(a), 16(b) and 17 disclose the stuck mixture 10 on the terminals 19a and 19b is removed by scraping, however the stuck mixture 10 can be removably blowing off the stuck mixture 10 with compressed air, or by a rinsing off the stuck mixture 10 with fluid.

Figure 18:
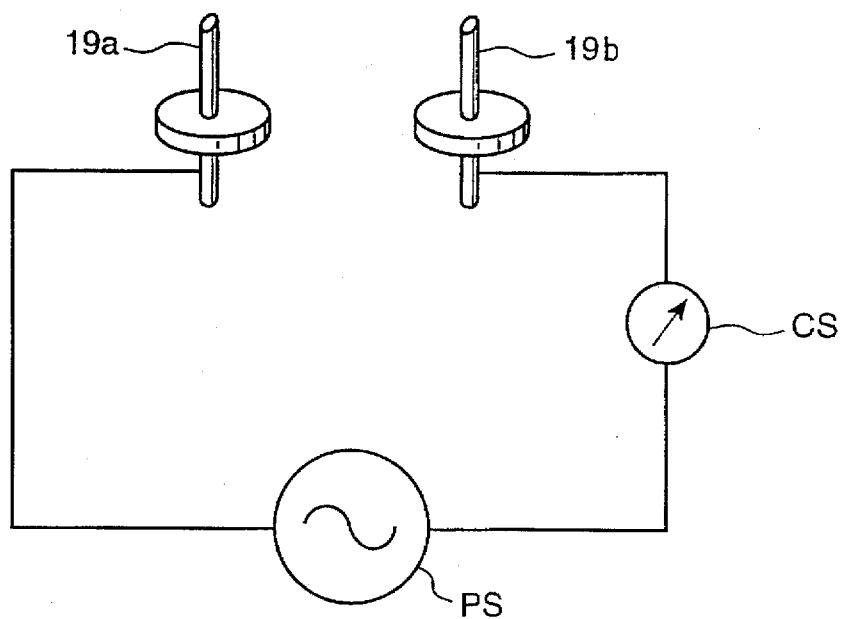
FIG. 18 is a schematic diagram of the electrical circuit of the impedance sensor.
Figure 19:
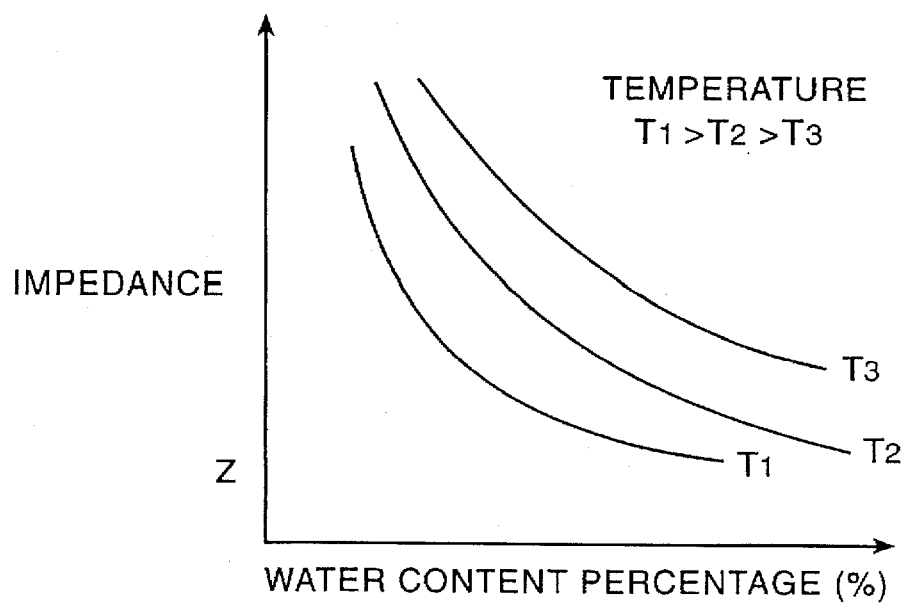
FIG. 19 is a graph showing the relationship of impedance detected by the impedance sensor to water content percentage.

FIG. 18 shows one possible circuit configuration for an impedance sensor. Terminals 19a and 19b connect to a power supply PS. Power supply PS can be either an AC or a DC power supply. A current sensor CS is connected between terminal 19b and power supply PS. The relationship between electrical impedance detected by the impedance sensor and water content percentage WP is shown in FIG. 19. The impedance is calculated on the basis of current flowing through terminals 19a and 19b. The impedance is affected by capacitance and inductance. However, the effect is small, therefore it is possible to impedance by an inverse value of current. Furthermore, impedance changes temperature T1, T2 and T3 of mixture 10. Thus, the water content sensor 11 should include a mixture temperature sensor for detecting mixture temperature and a correcting device to correcting for the effects of mixture temperature.

Figure 20:
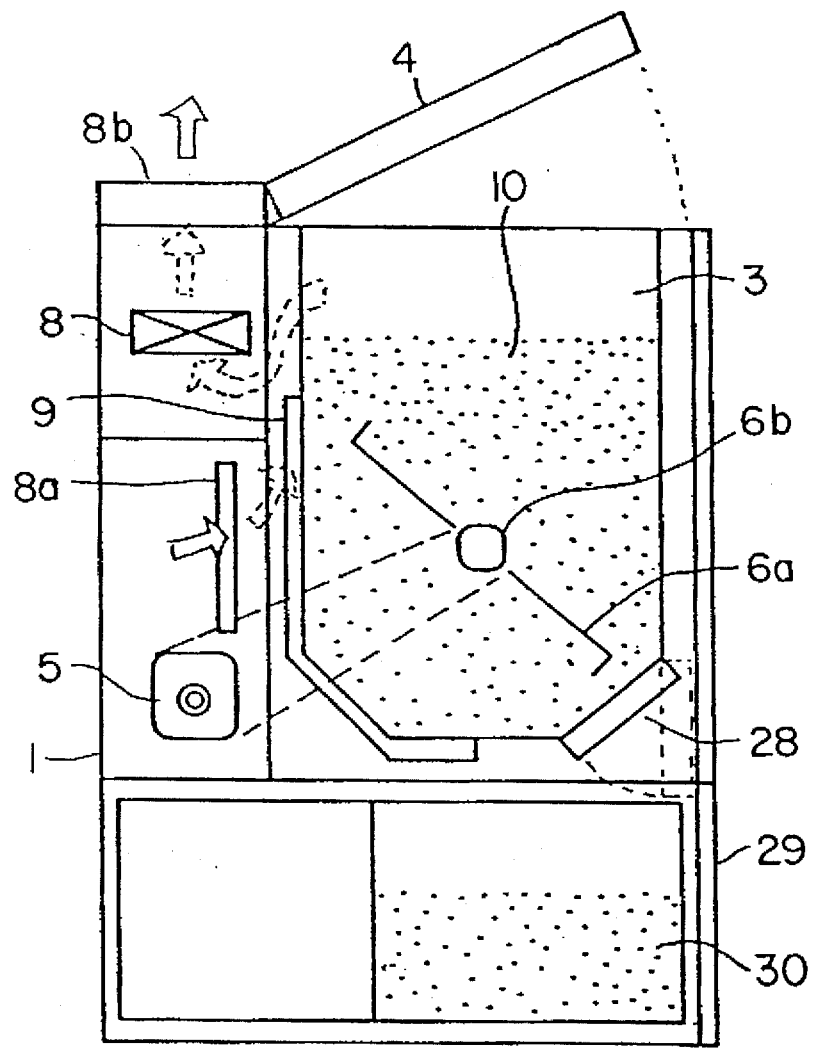
FIG. 20 is a cross-sectional view of an alternative embodiment of a garbage disposal according to the present invention.

Referring now to FIGS. 20 to 27(b), another embodiment of a garbage disposal according to the present invention will be explained. A casing 1 has a tank 3 therein filled with mixture 10 containing garbage, sawdust and microorganisms as shown in FIG. 20. Tank 3 is designed to have a thermal conductivity that is lower than that of the mixture 10, for example, stainless steal or high polymer. Substantially at the center of the tank 3, there is a shaft 6b rotatably supported by casing 1. Stirring motor 5 drives shaft 6b through a pulley and chain arrangement. Of course, other driving arrangements are possible within the scope of the present invention. An upper opening of the tank 3 is covered by a cover 4. Heater 9, for heating mixture 10, is attached at an outer surface of tank 3. Air pump 8 is mounted at an upper portion of motor 5. Air blown by the air pump 8 is drawn in via an air opening 8a and passes through the outer surface of tank 3, into the tank and is exhausted from an outlet opening 8b provided an upper portion of casing 1, as shown by the arrows in FIG. 20. The bottom portion of tank 3 has a discharge opening for removing mixture 10 when it is time for it to be exchanged.

Discharge cover 28 is supported at one end thereof by tank 3 to open and close the discharge opening. Discharge tank 30 is removably mounted in casing 1 at the lower portion of discharge cover 28. Discharge door 29 which can be open or shut is provided in front of discharge tank 30. When mixture 10 is exchanged, discharge cover 28 is opened, mixture 10 drops into discharge tank 30, and the discharge tank, filled with mixture 10 is removed through opened discharge door 29.

Figure 21A:
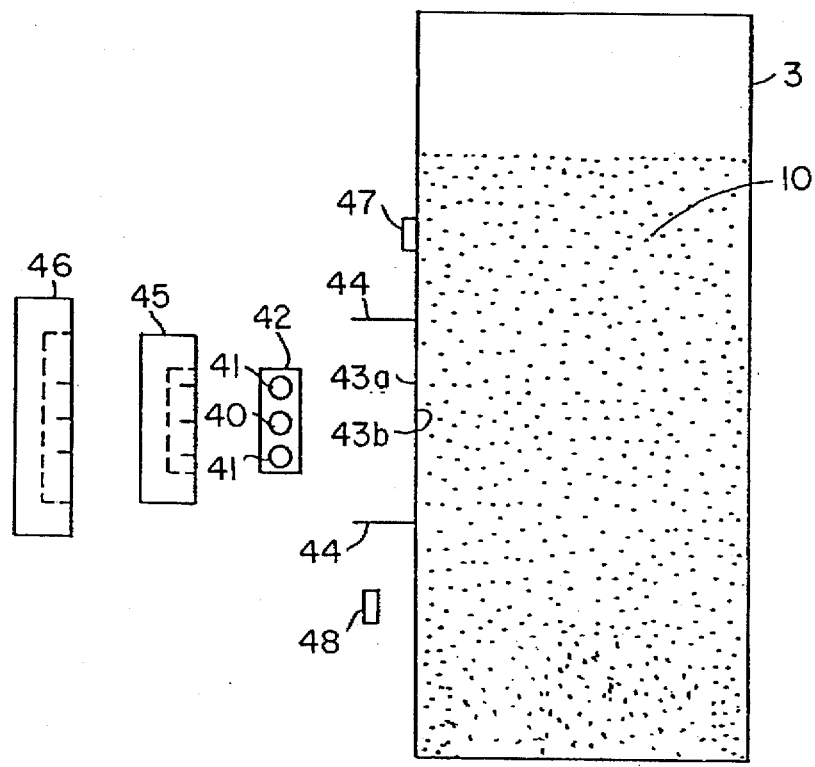
FIGS. 21(a) and 21(b) are enlarged cross-sectional views of the water content sensor attached to an outside surface of a garbage disposal tank.
Figure 21B:
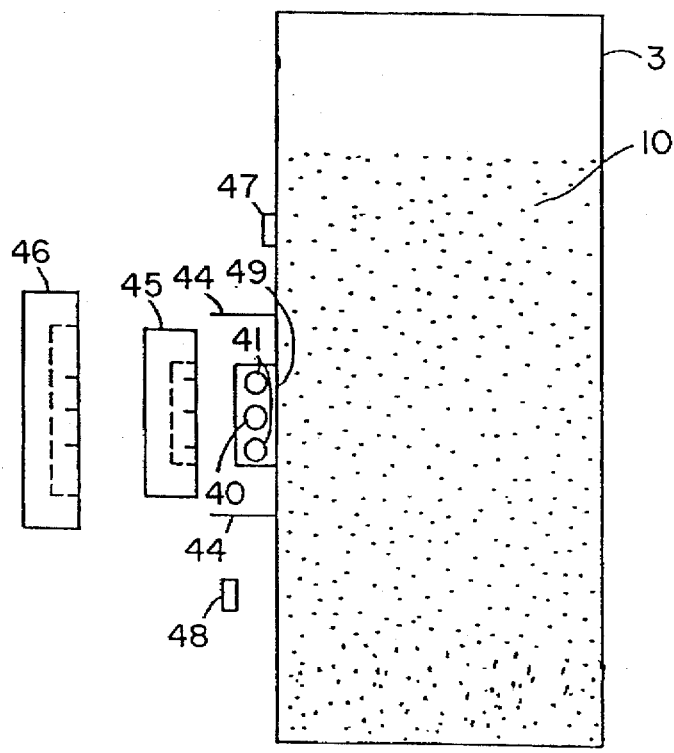

A water content sensor is shown in FIGS. 21(a) and 21(b). Water content sensor includes a temperature response sensor 40 held between two heating members 41. Temperature response sensor 40 and heating members 41 are molded into a sensor unit 42. Two supporting members 44 supporting sensor unit 42 are extended so as to define a space at an outer surface of tank 3 at the middle portion thereof. Sensor unit 42 is mounted to an outside sensing surface portion 43a of tank 3 between supporting members 44. An inside sensing surface portion 43b, corresponding to outer sensing surface portion 43a, directly touches mixture 10. Sensor unit 42 is covered by an insulating block 45 to prevent the temperature response sensor 40 from being influenced by the outside temperature. Insulating block 45 is covered by a fixing cover 46. Thus, sensor unit 42 is accurately fixed at a predetermined position.

A mixture temperature sensor 47 for detecting mixture temperature Tm is attached at an upper portion of sensor unit 42 on an outer surface of tank 3. An outside air temperature sensor 48 for detecting outside air temperature To is fixed near air opening 8a to measure air flowing into tank 3. FIGS. 21(a) and 21(b) show the various parts, above-described in exploded view so that their positional relationships can be easily seen. A portion of tank 3 between outside sensing surface portion 43a and inside sensing surface portion 43b, is designated as sensing portion 49 in FIG. 21(b).

This water content sensor 11 detects water content percentage WP in accordance based on the temperature response of the mixture after heating member 41 is actuated. The amount of temperature increase is determined by the difference between first and second temperatures measured by temperature response sensor 40. The second temperature is measured a predetermined time after the first temperature is measured while heating member 41 is energized.

The water content percentage WP of mixture 10 is related to the thermal conductivity of mixture 10. Thermal conductivity is inversely proportional to the heat response of the mixture. Accordingly, the water content percentage WP can be calculated from the measured heat response, i.e. the increase in temperature of the mixture when it is heated by a predetermined heating power over a predetermined period of time. Correspondingly, decreasing temperature could also be used. The decreasing temperature is calculated as the difference between at least two temperature detected at predetermined times while the temperature of the mixture is decreasing. For example, when heater 9 is turned off.

Figure 22:
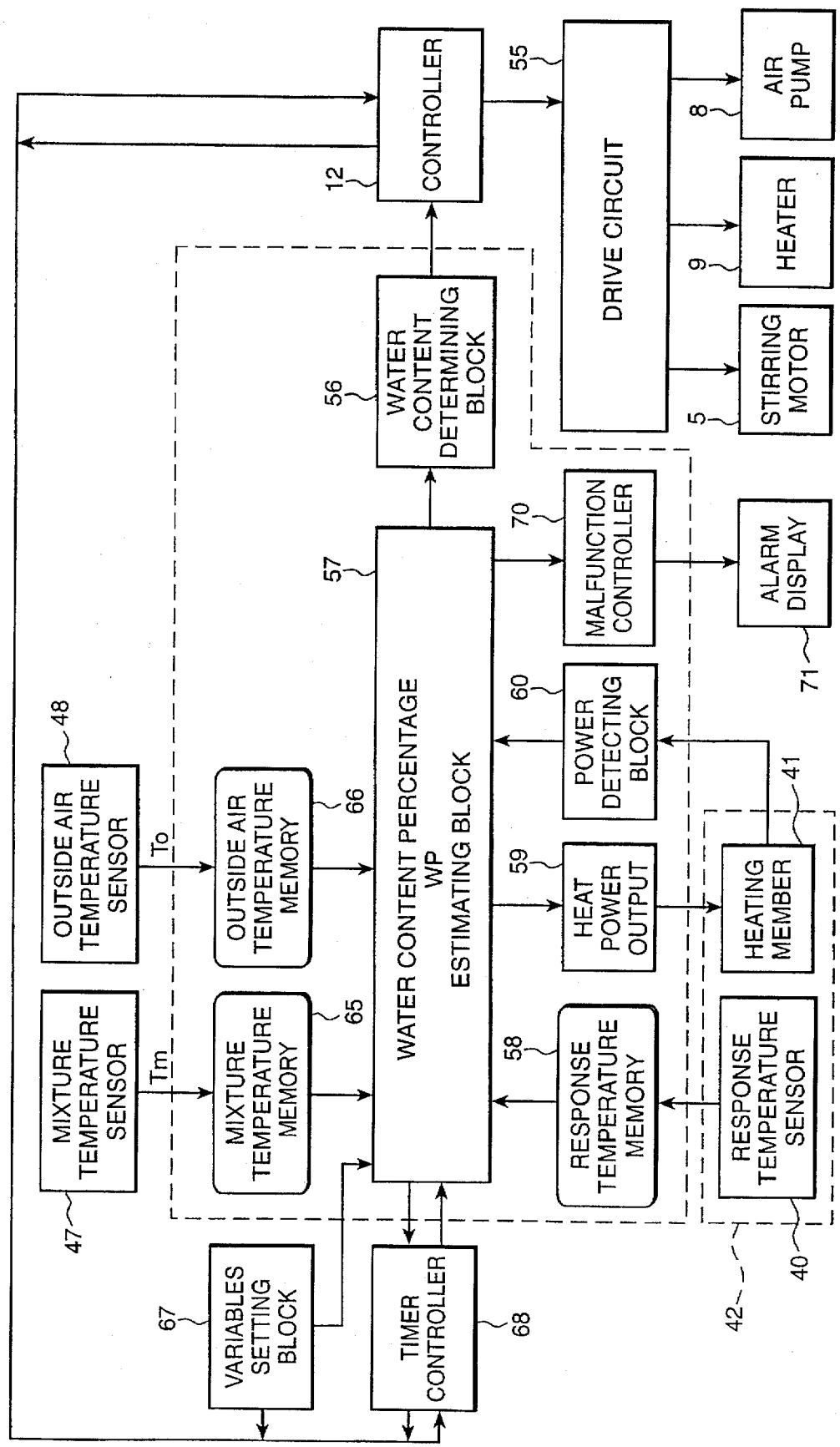
FIG. 22 is a functional block diagram of the garbage disposal shown in FIG. 19.

Water content sensor 11 and a controller 12 are shown in FIG. 22. Controller 12 controls stirring motor 5, heater 9 and air pump 8 through a drive circuit 55 in accordance with water content percentage WP imputed from water content determining block 56. Drive circuit 55 amplifies a signal from controller 12 to stirring motor 5, heater 9 and air pump 8, however, if an output voltage of controller 12 is sufficient to drive these devices, driving circuit 55 is not needed.

Temperature response sensor 40 is connected to water content percentage estimating block 57 passing through temperature response memory 58. Response temperature Tr detected by temperature response sensor 40 is stored once in temperature response memory 58, then the temperature data is supplied to estimating block 57.

Heat power output 59, which is a constant voltage power supply, supplies a constant electrical power to heating member 41. An operation of heater power output 59 is controlled by estimating block 57. A power detecting block 60 detects an electrical heating power HP supplied to heating member 41, and checks that heating power HP is in normal range. The result of checking is output to estimating block 57.

A mixture temperature sensor 47 to detect mixture temperature Tm is connected to mixture temperature memory 65, and an outside air temperature sensor 48 to detect outside air temperature To of the garbage disposal is connected to outside air temperature memory 66. Temperatures Tm and To are stored in each memory 65 and 66 once, then these temperatures Tm and To are supplied to estimating block 57.

Variables setting block 67 to set several variables designating length of time and calculation of water content percentage WP is connected to estimating block 57 and timer controller 68. A timer controller 68 controls the times at which detection and calculation of water content percentage WP are carried out. A malfunction controller 70, which drives a control alarm display 71, is connected to estimating block 57. When estimating block 57 detects a malfunction, it outputs a malfunction signal to malfunction controller 70, which in turn drives alarm display 71 to indicate the type of malfunction that has occurred.

Estimating block 57 determines an estimated water content percentage WPe in accordance with response temperature Tr, mixture temperature Tm, and outside air temperature To, and transfers the estimate water content percentage WPe to water content determining block 56. Water content determining block 56 decides the water content percentage WP on the basis of estimated water content percentage WPe.

In the above described garbage disposal embodiment, sensor unit 42 including temperature response sensor 40 and heating member 41 is closely and tightly attached to outside sensing surface portion 43a of tank 3, and tank 3 is made of low thermal conductivity material. Accordingly, heating member 41 efficiently heats mixture 10, and temperature response sensor 40 detects accurate temperature of the mixture heated by heating member 41.

Detection of water content percentage WP will now be explained in further detail. Heat generated by heating member 41 transfers to molded sensor unit 42. Then, heat diffuses over only a narrow area near outside sensing surface portion 43a and inside surface sensing portion 43b. Diffused heat at inside sensing surface portion 43b is transferred to the mixture touching portion 43b. Almost all of the heat generated by heat member 41 is transferred to the mixture. There is little heat transferred to tank 3 because tank 3 is made of a low heat conductivity material. Therefore, the temperature at portion 43a depends primarily on the thermal conductivity of mixture 10. Accordingly, when heater member 41 is energized, increasing temperature, detected by temperature response sensor 40, at portion 43a depends on the thermal conductivity of mixture 10 which is a function of the water content percentage WP of the mixture. When mixture 10 contains a lot of water, the thermal conductivity of the mixture is high, so there is little increase of temperature detected by temperature response sensor 40. On the other hand, when mixture 10 is relatively dry, the thermal conductivity of the mixture is low, so the increase in temperature is large.

If tank 3 were made of high thermal conductivity material, for example aluminum or copper, heat generated by heating member 41 would be efficiently transferred to a wide area of tank 3. So, almost all of the change of temperature at portion 43a would depend on the thermal conductivity of tank 3, the change of temperature at portion 43a would be almost the same whether the water content percentage WP is high or low. Therefore, the effect of the thermal conductivity of the mixture would be inefficiently detected by temperature response sensor 40. Accordingly, it would be difficult to detect water content percentage WP from response temperature Tr.

Figure 23:
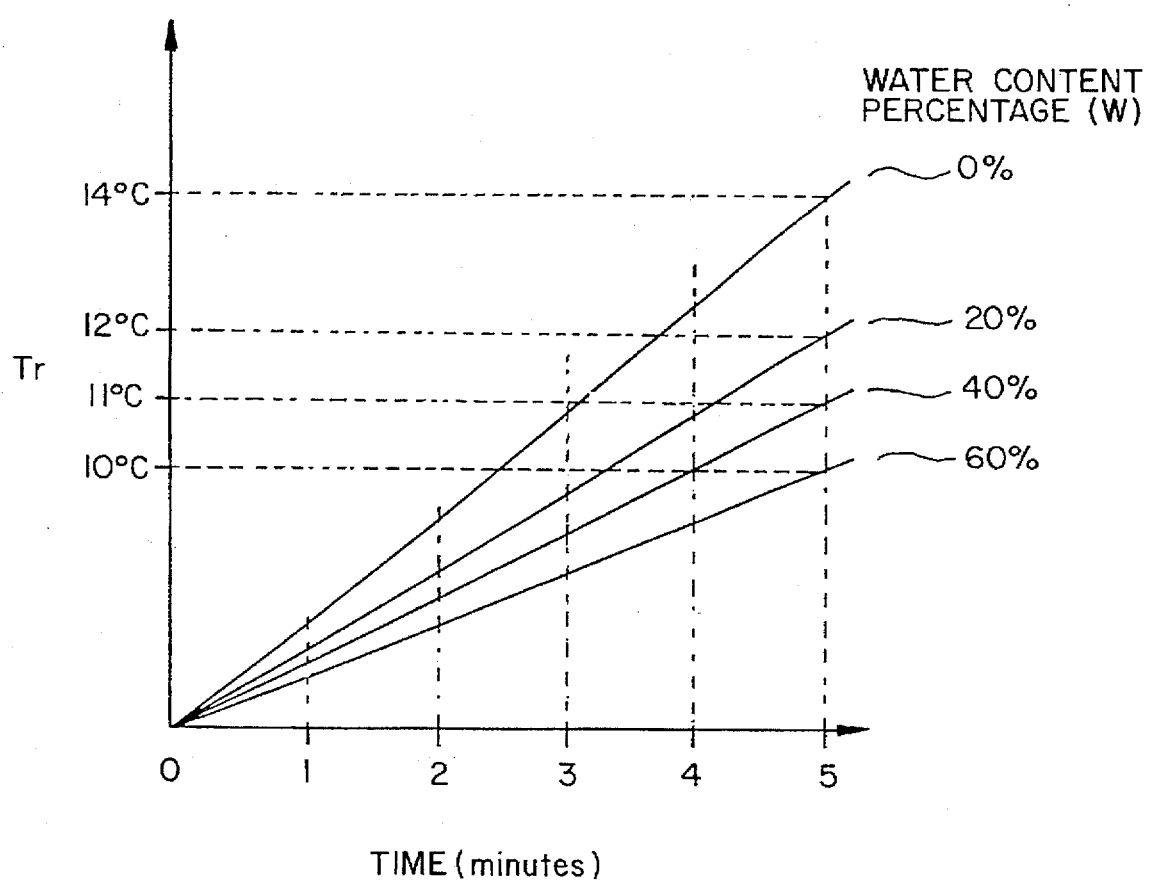
FIG. 23 is a graph showing the time response of temperature change detected by a temperature sensor of the water content sensor for various water content percentage conditions.

Referring now to FIG. 23, the relationship between response temperature Tr and water content percentage WP will be explained. At the "0" in FIG. 23, electrical power begins to be supplied to heating member 41. Response temperature Tr, detected by temperature response sensor 40, increases substantially linearly after heating starts. Response temperature Tr depends on water content percentage WP and heating time. Namely, response temperature Tr is proportional to heating time, and is inversely proportional to water content percentage WP. It is possible to detect water content percentage WP from heating time and response temperature Tr while heat is being generated by heating member 41. For example, at 5 minutes after heating member 41 is energized, if response temperature Tr is 14° C., water content percentage WP is 0%. If Tr is 12° C., water content percentage WP is 20%. If Tr is 11° C., water content percentage WP is 40%. If Tr is 10° C., water content percentage WP is 60%.

Figure 24:
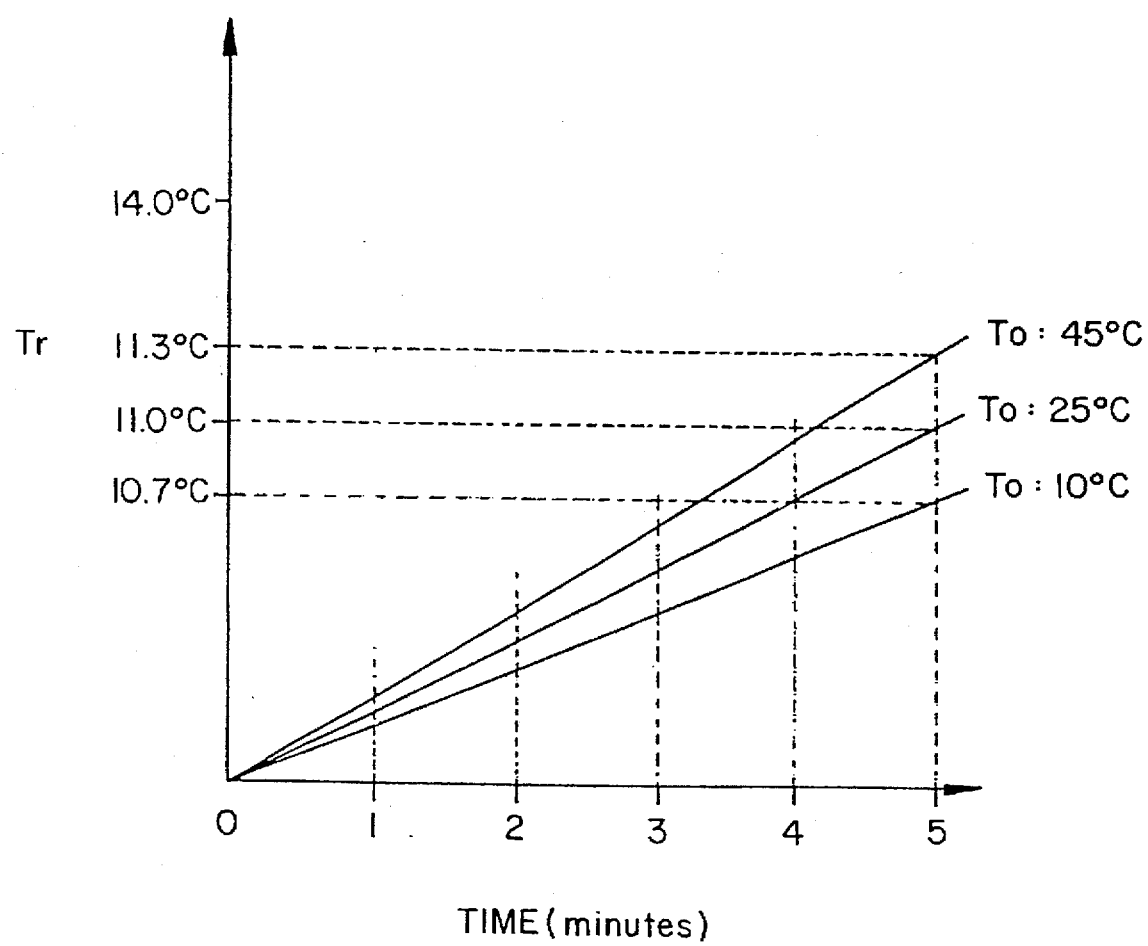
FIG. 24 is graph of the change of response temperature under several outside temperature conditions.

As above described, water content percentage WP can be determined based on heating time and response temperature Tr detected by temperature response sensor 40, although response temperature Tr also depends on outside air temperature To. The relationship between response temperature Tr and outside air temperature To is shown in FIG. 24. In FIG. 24, water content percentage WP is fixed at 40%. The greater the outside air temperature To, the more response temperature Tr increases for a given heating time. Accordingly, it is necessary to correct water content percentage WP calculated from response temperature Tr based upon outside air temperature To in order to accurately determine water content percentage WP.

Figure 25:
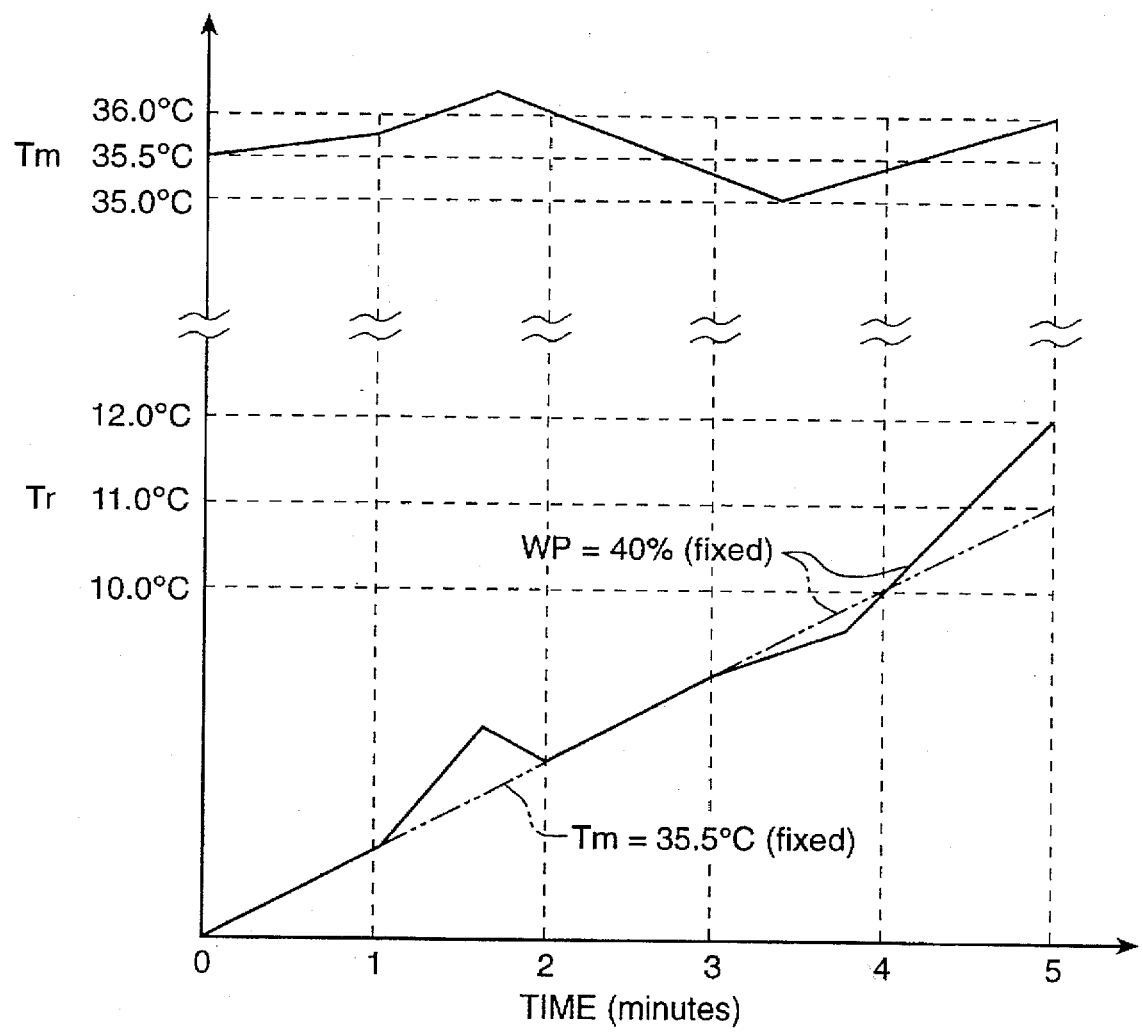
FIG. 25 is a graph of the change of mixture temperature and response temperature for a fixed water content.

Further, response temperature Tr is changed by mixture temperature Tm detected by mixture temperature sensor 47 shown in FIG. 25. The broken line in the figure shows response temperature Tr with fixed mixture temperature at 35.5° C. and water content percentage WP at 40% in FIG. 25. Response temperature Tr is proportional to mixture temperature Tm. Thus, it is also necessary to correct water content percentage WP calculated from response temperature Tr based up on mixture temperature Tm. However, if the effect of outside air temperature To and mixture temperature Tm is small, the water content percentage WP calculated from response temperature Tr does not need to be corrected.

Figure 26:
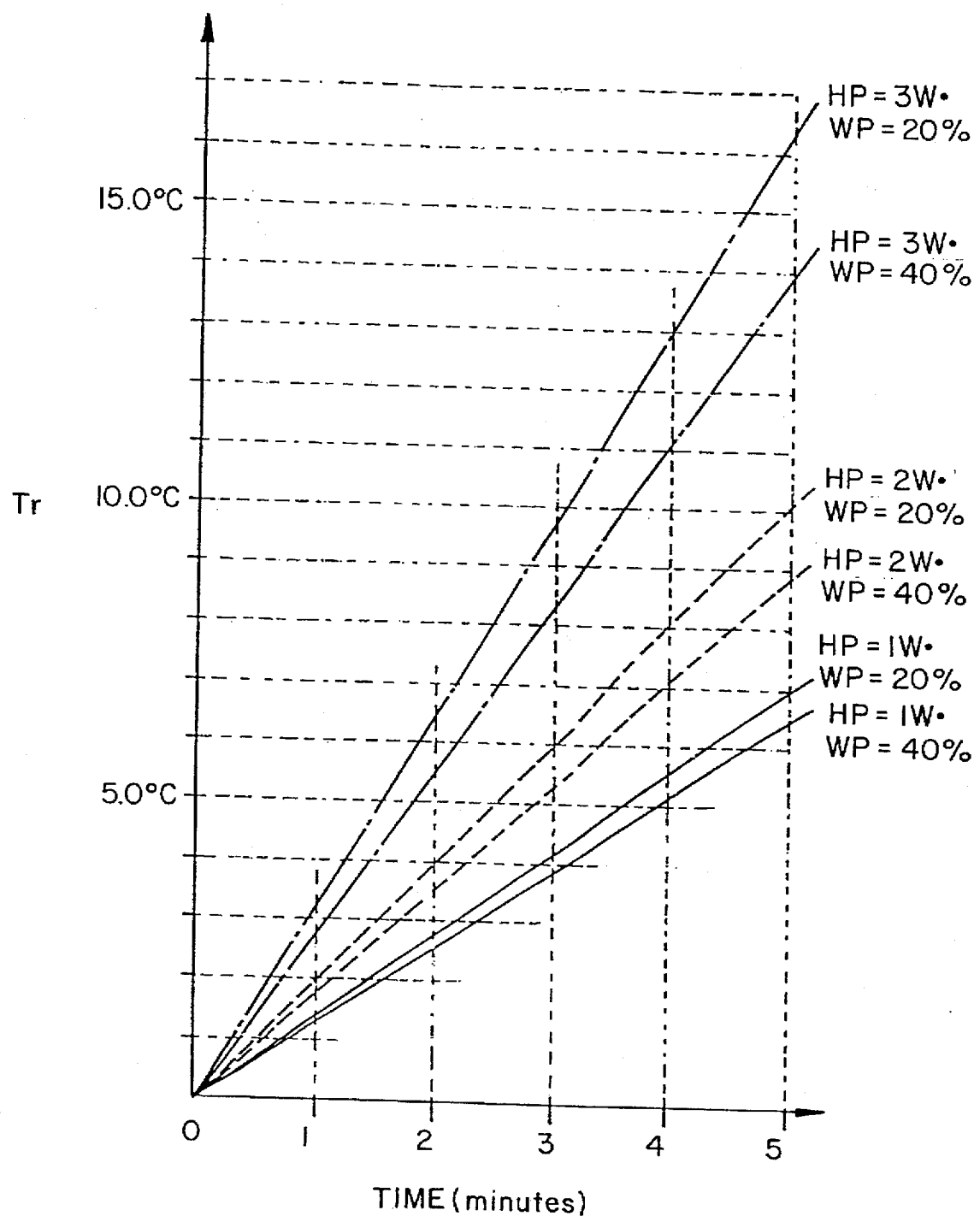
FIG. 26 is a graph of change of response temperature for several water content and heater power conditions.

The relationship between heating power HP and response temperature Tr is shown in FIG. 26. Response temperature Tr is proportional to heating power HP of heating member 41. The greater the heater power HP, the greater the increase in temperature Tr. Therefore, the power supplied to heating member 41 must be stable.

Figure 27A:
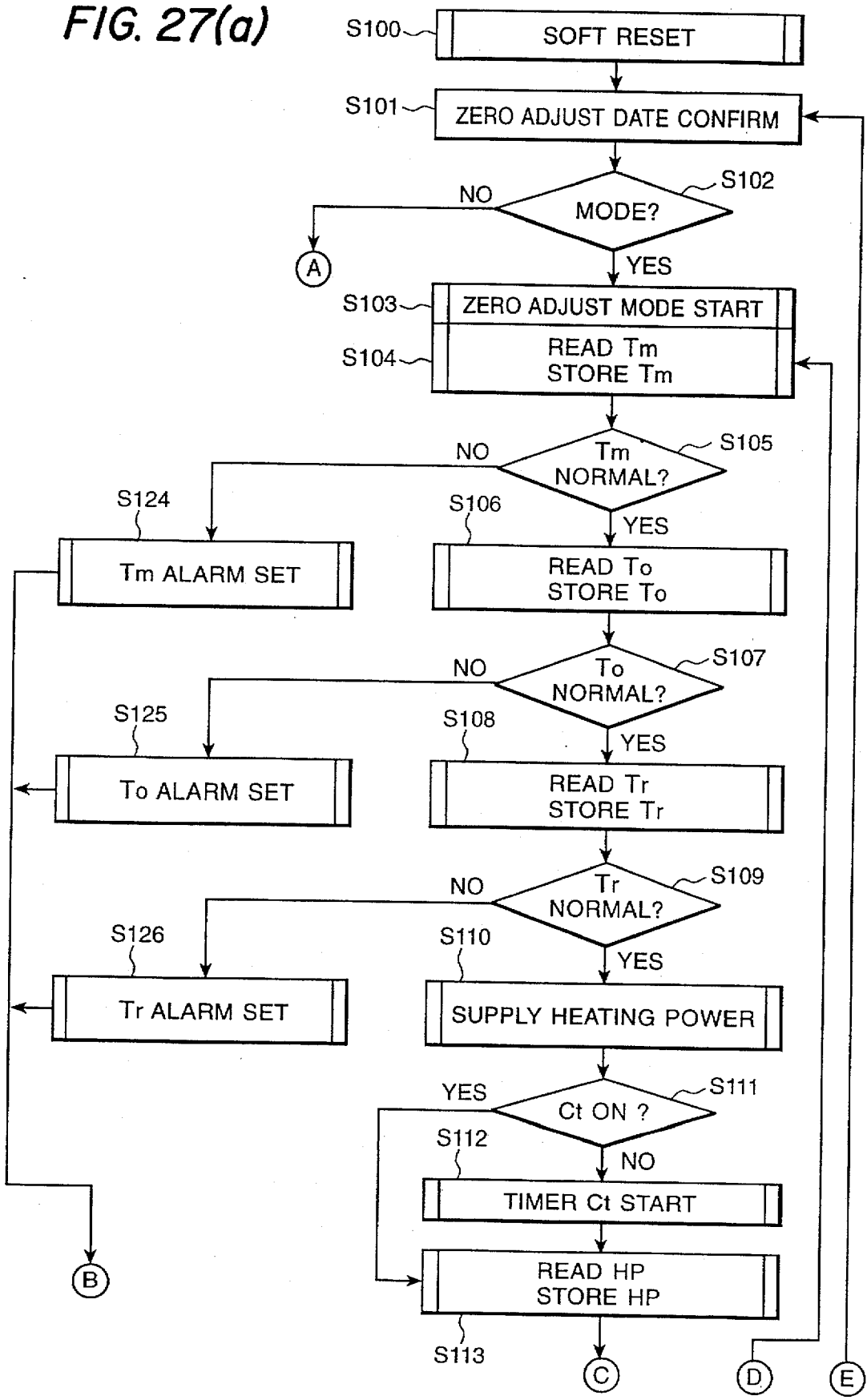
FIGS. 27 (a) and 27(b) are flow charts explaining control of the garbage disposal shown in FIG. 19.
Figure 27B:
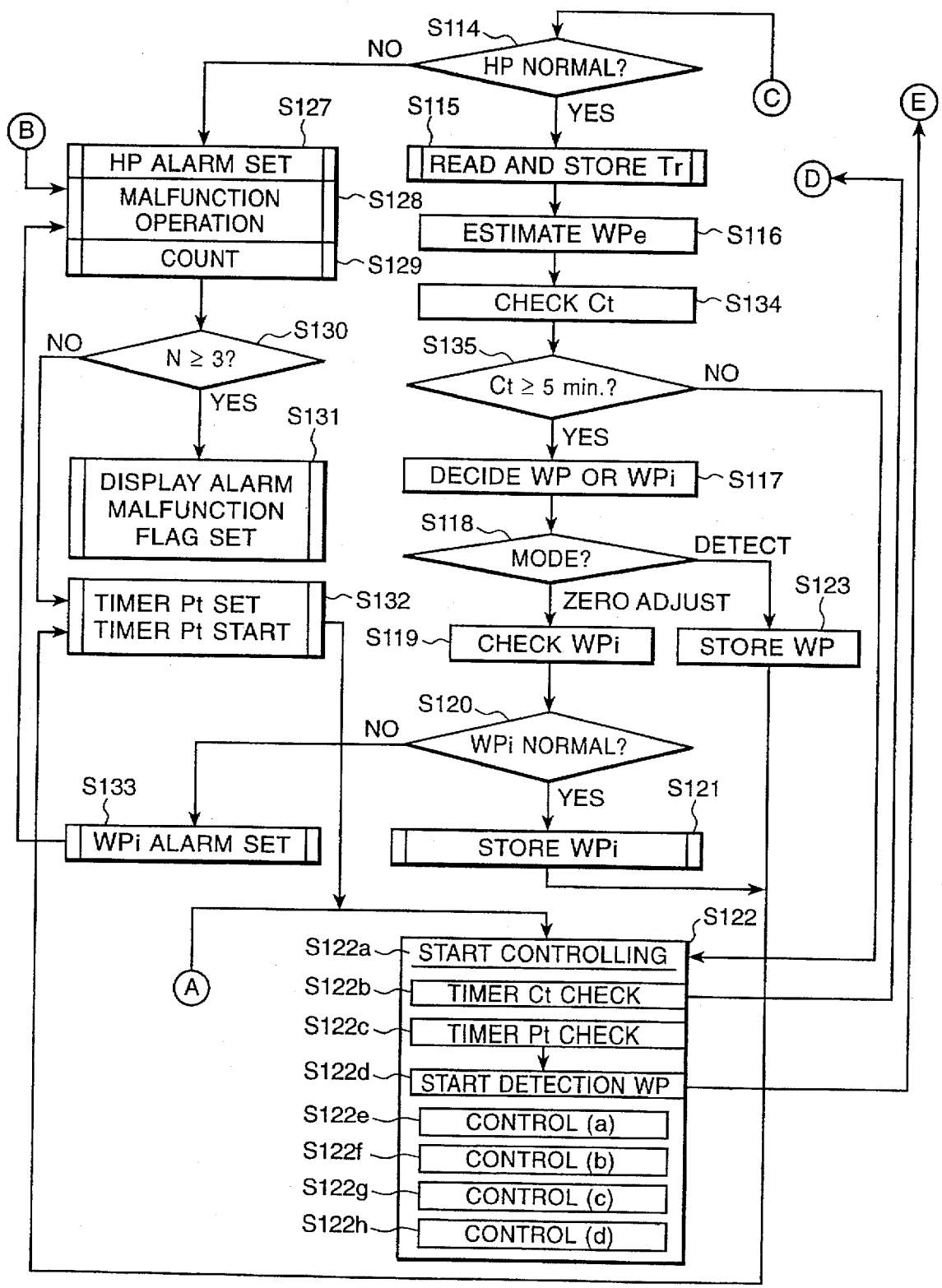
Figure 31:
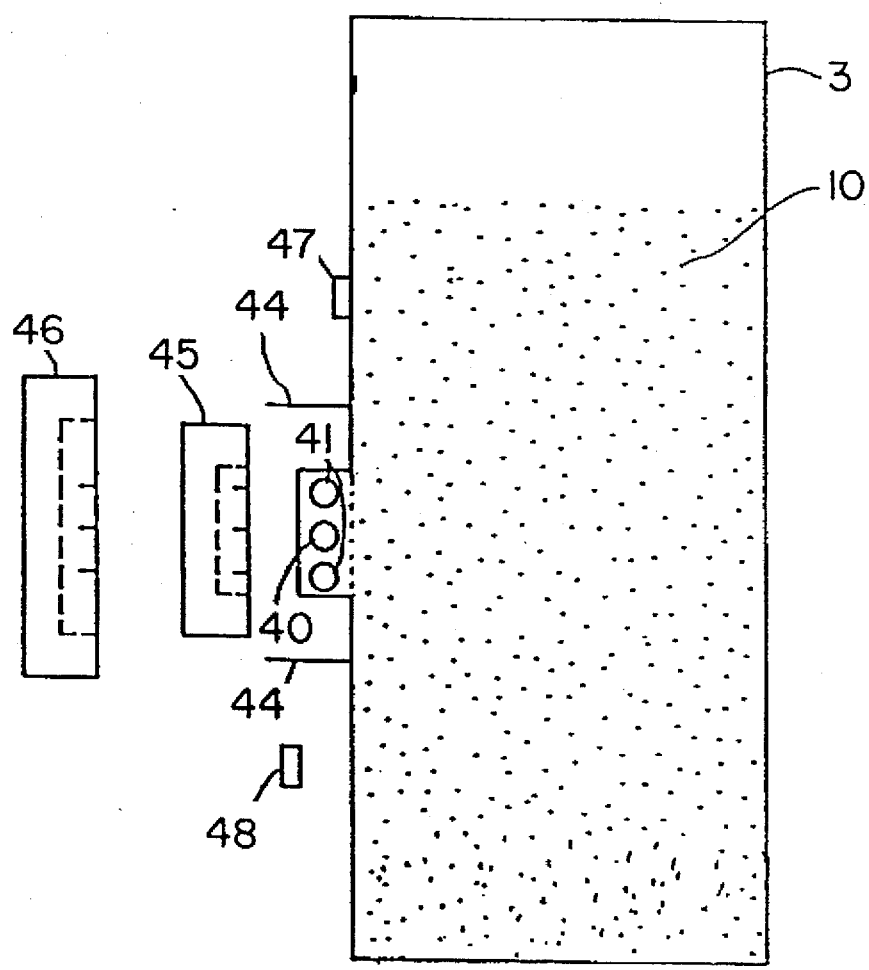
FIG. 31 is an enlarged cross-sectional view of another configuration of the garbage disposal wherein the water content sensor is attached to the tank.

Referring now to FIGS. 27(a) and 27(b), operation of the garbage disposal will be explained. The garbage disposal can be operated 1) in a so-called "zero adjust mode" during which it can be calibrated to correctly determine water content percentage WP and 2) in a so-called "detect mode" to actually detect water content percentage WP. Zero adjust mode operation is carried out before putting mixture 10 into the garbage disposal. The zero adjust mode is carried out at the factory before it is sold. In zero adjust mode, data detected by the various sensors are checked and stored when the water content percentage WP is known to be 0%. After putting mixture 10 including sawdust, microorganisms and garbage, into tank 3, the garbage disposal is switched to detect mode operation. First, the garbage disposal is turned on, then hard reset is released, and soft reset is carried out (step S100). In step S101, data from zero adjust mode is checked. In step S102, inquiry is made as to whether operation mode is zero adjust mode or detect mode in accordance with the data checked in step S101. If the garbage disposal is operating in detect mode, the control goes to step S122. On the other hand, if the garbage disposal is operating in zero adjust mode, control goes to step S103, and steps S104 to S107 for inputting detected sensor data. In step S103, data memory for zero adjust mode is reset. Mixture temperature Tm detected by sensor 47 is read and stored in mixture temperature memory 65 (step S104). In step S105 which follows, inquiry is made as to whether mixture temperature Tm is in a normal range in order to decide whether mixture temperature sensor 47 is operating correctly or not. In steps S106 to S109, outside air temperature To, and response temperature Tr are checked respectively. Before using the garbage disposal, all temperatures including mixture temperature Tm, outside air temperature To, and response temperature Tr must be substantially the same value. Therefore, if Tr=To±2° C., both temperature sensors 48, 40 are considered to be normal. If the temperature is beyond outside air temperature To±2° C., it is decided that the sensor is malfunctioning. If inquiry steps S105, S107, S109 detect a malfunction, a malfunction alarm referring to the sensor detected malfunction is set in step S124, S125 and S126.

In the following steps S110 to S113, heat power output 59 and heating member 41 are checked by power detecting block 60. In step S110, heat power output 59 starts to output electrical power to heating member 41. Then, inquiry is made as to whether a temperature detecting timer Ct included in timer controller 68 is operating (step S111). If timer Ct has not been started, it is started at step S112. If timer Ct has already been started, power detecting block 60 detects heating power HP supplied to heating member 41 (step S113). Then it is decided whether heating power HP is normal by comparing detected heating power HP to a predetermined value (step S114). If heating power HP is not normal, operation flow goes to malfunction operation step S127. If heating power HP is normal, response temperature Tr is stored in response temperature memory 58 (step S115).

In step 116, estimated water content percentage WPe is determined on the basis of mixture temperature Tm, outside air temperature To and response temperature Tr. Then time counted by timer Ct is checked (step S134). In following step S135, inquiry is as to whether detecting timer Ct counts more than 5 minutes. If NO, operation flow goes to step S122. If YES, water content percentage WP is decided (step S117). The water content percentage WP decision depends upon the operation mode of water content sensor 11. When the garbage disposal is operating in zero adjust mode, initial water content percentage WPi, which is used for adjusting water content percentage WP in detect mode, is calculated. In zero adjust mode, the initial water content percentage WPi is determined by averaging 10 estimated water content percentages WPe, each detected and calculated over a 30 second interval during a 5 minute time period. However, when the garbage disposal is operating in detect mode, water content percentage WP is determined to correct an average water content percentage WPa, which is an average of 10 estimated water content percentages WPe detected and calculated during 30 seconds intervals over a 5 minutes time span, with initial water content percentage WPi.

In step S118, operation mode is checked as to whether zero adjust mode or detect mode. If operation mode is zero adjust mode, initial water content percentage WPi decided in step S117 is compared with initial standard data (step S119). Then initial water content percentage WPi is checked as to whether it is normal or in accordance with the result of step S119 (step S120). If initial water content percentage WPi is normal, the data is stored.

If the garbage disposal is operating in detect mode in step S118, water content percentage WP is stored in order to control the water content percentage WP of mixture 10 in the garbage disposal (step S123). Then detecting timer Ct is reset, and a detecting prohibiting timer Pt to prohibit the detection of water content percentage WP is started (step S132). Prohibiting timer Pt is provided in order to detect water content percentage WP. Stirring motor 5, heater 9 and air pump 8 do not operate while prohibiting timer Pt prohibits such operation. Prohibiting timer Pt is alternatively operating detecting timer Ct. Thus the detection of water content percentage WP is carried out only when stirring motor 5, heater 9 and air pump 8 are not operating. Thus, the water content percentage is detected without the influence of stirring, heating and air flowing.

After step S132, the operation flow goes to step S122, and normal controlling steps S122a to S122h are carried out. Actual controlling operations begin at step S122a. If timer Ct is determined to be operating, operation flow returns to step S104 (step S122b) and heating power HP is supplied to heating member 41. Then, mixture temperature Tm, outside air temperature To and response temperature Tr are detected (steps S104 to S115) and water content percentage WPe is estimated (step S116) at 30 seconds intervals. The supply of heating power HP to heating member 41 is synchronized with the operation of detecting counter Ct. The operation from step S104 to S134 is frequently repeated until detecting timer Ct counts 5 minutes (step S135). Namely, all temperature sensors detect in 30 seconds intervals while detecting timer Ct counts 5 minutes. Consequently, estimated water content percentage WPe is repeated 10 times during one detecting timer Ct term, or 5 minutes. When detecting timer Ct counts 5 minutes (Step S135), prohibiting timer Pt starts to count and at the same time detection of water content percentage WP is stopped (step S132, Step S122c). After prohibiting timer Pt counts predetermined prohibiting time, for example 55 minutes, prohibiting timer Pt is stopped, and operation flow goes to step S101 and detection of water content percentage WP is started (step S122d). The output from heater power output 59 is also stopped while prohibiting timer Pt is stopped. Accordingly, water content percentage WP is detected for 5 minutes at prohibiting time, or 55 minutes, intervals.

After detecting water content percentage WP, controller 12 controls stirring motor 5, heater 9 and air pump 8 in accordance with water content percentage WP stored in step S123 (step S122e to 122h) as shown in FIGS. 28(a) to 30(e). The control operation of controller 12 is also determined by mixture temperature Tm. When mixture temperature Tm is higher than 20° C., heater 9 is turned off regardless of water content percentage WP. However, when mixture temperature Tm is lower than 20° C., heater 9 is synchronized with stirring motor 5 both being turned on simultaneously.

When the water content percentage WP is between 10% and 30%, control (a) is selected (step S122e). In control (a), air pump 8 is turned off and stirring motor 5 is energized for a 3 minute interval during each 30 minute time period as shown in FIGS. 28(a) to 28(e). Accordingly, evaporation of water from the mixture is reduced and the mixture is kept from drying out.

When the water content percentage WP is between 30% and 50%, control (b) is selected (step S122f). In control (b), stirring motor 5 is energized for a 6 minute interval during each 30 minute time period and air pump 8 is energized for 19 minutes after stirring motor 5 stops during each 30 minute time period as shown in FIGS. 29(a) to 29(e). In this condition, water included in mixture 10 is properly evaporated, and the proper conditions for decomposing garbage are maintained.

When the water content percentage WP is between 50% and 90%, control (c) is selected (step S122g). In control (c), stirring motor 5 is energized for 15 minutes during each 30 minute interval and air pump 8 is energized 20 minutes during 30 minutes as shown in FIGS. 30(a) to 30(e). In this condition, evaporation of water in the mixture is hastened, so that the water content percentage WP is reduced.

As shown FIGS. 28(a) to 30(e), detecting timer Ct counts time while stirring motor 5, heater 9, and air pump 8 are stopped. Therefore, the detection of water content percentage WP may avoid the effects of stirring, heater 9 and air blowing by pump 8.

When water content percentage WP is less than 10% or more than 90%, control (d) is selected (step S122h). In control (d), stirring motor 5, heater 9 and air pump 8 are kept off.

Steps S127 to S131 and S133 are malfunction operation steps. If heat power on HP is not normal in step S114, HP alarm is set (step S127). If initial water content percentage WPi is not normal in step S120, water content percentage WP alarm is set (step S133). If at least one of the alarms among mixture temperature Tm (step S124), outside air temperature To (step S125), response temperature Tr (step S126), heat power HP (step S127) and water content percentage WP (step S133) is set, a malfunction operation is carried out (step S128). The output from heater power output 59 is stopped and the number of times N to stop the heater power output in malfunction states at step S128 is counted (step S129). If N is less than 3, the operation flow goes to step S132. Detecting of water content percentage WP starts again after the prohibiting timer finishes counting. After that, when the initial water content percentage WPi is normal in step S120, the alarm detection is assumed to be caused by electrical noise, and N is reset. If N is 3, malfunction alarm is displayed on alarm display 71 by a malfunction controller 70 and malfunction flag is set. Stirring motor 5, heater 9 and air pump 8 are kept off (step S131). Consequently, if detection of water content percentage WP including temperature detecting (step S124 to S127) fails 3 times, alarm display 71 is turned on.

Sensor unit 42 is attached on the outer surface of tank 3, however an alternative attachment for sensor unit 42 can be used, as shown in FIG. 29. A side of tank 3 has a opening that is substantially the same size as that of sensor unit 42. Sensor unit 42 is attached to the opening, closing the opening. In this construction, sensor unit 42 directly touches mixture 10. Therefore, it is efficient to transfer the heat from heating member 41 to mixture 10, and to transfer the heat from the mixture to the response the temperature sensor 40. Consequently, temperature response sensor 40 detects accurate response temperature. In this construction, response temperature Tr is not affected by the thermal conductivity of tank 3, therefore it is not necessary that tank 3 be made of a low thermal conductivity material.

In the above embodiments, sawdust is used as a medium, however any other material having tiny holes in which microorganisms can live, for example zeolite or pearlitecan, can be used. If a media different from sawdust is used, the appropriate water content percentage WP for that medium should be used.

Various changes and modifications to the above described embodiment can be carried out without departing from the scope of the general inventive concept as defined by the appended claims and their equivalents.

What is claimed is:

1. A garbage disposal for decomposing garbage using microorganisms, comprising:

a tank for containing a medium having said microorganisms, said tank being configured to receive said garbage including organic material to form a mixture;

stirring means for stirring contents of said tank; and control means for controlling a water content percentage of said mixture, said control means comprising:

detecting means for detecting said water content percentage, comprising:

two terminals for contacting said mixture in said tank; and voltage supplying means for supplying a voltage between said two terminals; and current detecting means for detecting a current flow through said two terminals.

2. The garbage disposal according to claim 1, wherein said two terminals are provided on an internal surface of the tank.

3. The garbage disposal according to claim 1, wherein said detecting means further comprises a scraping means for scraping said mixture adhering to said two terminals.

4. A garbage disposal for decomposing garbage using microorganisms, comprising:

a tank for containing a medium having said microorganisms, said tank being configured to receive said garbage including organic material to form a mixture;

stirring means for stirring contents of said tank;

stirring control means for energizing said stirring means at predetermined intervals; and control means for controlling a water content percentage of said mixture, wherein said control means comprises detecting means for detecting said water content percentage of said mixture.

5. The garbage disposal according to claim 4, wherein said detecting means comprises:

two terminals for contacting said mixture in said tank;

voltage supplying means for supplying a voltage between said terminals;

current detecting means for detecting a current flow through said two terminals when said stirring means is energized; and calculating means for calculating an average of a current value detected by said current detecting means.

6. The garbage disposal according to claim 4, wherein said stirring means comprises:

a motor;

an axis member connected to said motor and rotated by said motor; and a stirring member connected to said axis member and provided in said tank for stirring said mixture.

7. The garbage disposal according to claim 6, wherein said control means comprises:

torque detecting means for detecting a torque of said motor;

water contents measuring means for determining said water content percentage based on said torque of said motor detected by said torque detecting means.

8. The garbage disposal according to claim 4, wherein said detecting means comprises:

a humidity sensor provided in an upper space of said tank for detecting humidity in said tank; and calculating means for calculating said water content percentage from said humidity detected by said humidity sensor.

9. The garbage disposal according to claim 4, wherein said detecting means comprises:

a color sensor for detecting a color of said mixture in said tank; and deciding means for deciding said water content percentage in accordance with said color detected by said color sensor.

10. The garbage disposal according to claim 4, wherein said detecting means comprises:

weighing means for weighing said mixture; and deciding means for deciding said water content percentage in accordance with a weight detected by said weighing means.

11. The garbage disposal according to claim 4, wherein said detecting means comprises:

a temperature sensor for measuring a temperature of said mixture;

determining means for determining said water content percentage in accordance with said temperature detected by said temperature sensor.

12. The garbage disposal according to claim 4, wherein said predetermined interval is set according to said water content percentage.

13. A garbage disposal for decomposing garbage using microorganisms, comprising:

a tank for containing a medium having said microorganisms, said tank being configured to receive said garbage including organic material to form a mixture;

stirring means for stirring contents of said tank; and control means for controlling a water content percentage of said mixture, comprising:

detecting means for detecting said water content percentage stirring control means for controlling said stirring means in accordance with said water content percentage detected by said detecting means.

14. The garbage disposal according to claim 13, wherein said control means comprises:

a heater for heating said mixture; and heater control means for controlling a power of said heater in accordance with said water content percentage detected by said detecting means.

15. The garbage disposal according to claim 14, wherein said control means further includes a temperature sensor for measuring a temperature of said tank, and wherein said heater control means controls said power of said heater so that said temperature measured by said temperature sensor is maintained between 10° C. and 50° C.

16. The garbage disposal according to claim 14, further including:

deodorizing means for deodorizing said mixture; and deodorizing control means for energizing said deodorizing means when said heater is energized.

17. The garbage disposal according to claim 13, wherein said control means comprises:

a blower for blowing air against said mixture; and blower control means for controlling said blower in accordance with said water content percentage detected by said detecting means.

18. The garbage disposal according to claim 17, further including:

deodorizing means for deodorizing said mixture; and deodorizing control means for energizing said deodorizing means when said blower is energized.

19. The garbage disposal according to claim 13, wherein said control means further includes a water tank to supply water to said mixture when said detecting means detects a water content percentage less than a predetermined value.

20. The garbage disposal according to claim 13, wherein said control means includes a refrigerator for condensing water from air and supplying said water to said mixture when said detecting means detects a water content percentage less than a predetermined value.

21. The garbage disposal according to one of claims 1 to 20, wherein said medium is sawdust, and said control means controls said water content percentage to be between 10% and 60%.

22. A garbage disposal for decomposing garbage using microorganisms comprising:

a tank for containing a medium having said microorganisms, said tank being configured to receive said garbage including organic material to form a mixture;

a stirring rod provided in said tank for stirring contents of said tank;

a stirring motor for rotating said stirring rod;

a heater for heating said mixture;

a blower for blowing air against said mixture;

detecting means for detecting a water content percentage of said mixture; and water control means for controlling said stirring means, said heater and said blower in accordance with said water content percentage detected by said detecting means.

23. The garbage disposal according to claim 22, wherein said water control means first reduces a frequency of the stirring motor, then reduces a power of said heater and finally reduces an air volume of said blower when said water content percentage detected by said detecting means is less than a first predetermined value, and said water control means first increases said air volume of said blower, then increases said power of said heater and finally increases said frequency of said stirring motor when said water content percentage detected by said detecting means is greater than a second predetermined value.

24. A garbage disposal for decomposing garbage using microorganisms comprising:

a tank containing a mixture of said garbage and a medium having said microorganisms;

stirring means for stirring said mixture in said tank;

heating means for heating said mixture;

a temperature sensor for detecting a temperature of said mixture;

detecting means for detecting a water content percentage of said mixture in accordance with said temperature detected by said temperature sensor, wherein said detecting means includes a calculating means for calculating an increase of said temperature detected by said temperature sensor, and wherein said detecting means detects said water content percentage in accordance with said increase calculated by said calculating means; and control means for controlling said water content percentage.

25. The garbage disposal according to claim 24, further including a heat control means for controlling turning on and turning off said heating means; and wherein said calculating means calculates said increase when said heating means is turned on by said heat control means.

26. The garbage disposal according to claim 25, wherein said tank is made of a low thermal conductivity material.

27. The garbage disposal according to claim 25, wherein a thermal conductivity of said tank is lower than a thermal conductivity of said mixture.

28. The garbage disposal according to claim 25, wherein said tank is made of stainless steel.

29. The garbage disposal according to claim 25, wherein said tank is made of high polymer.

30. The garbage disposal according to claim 25, wherein said temperature sensor and said heating means are attached at an outer surface of said tank.

31. The garbage disposal according to claim 25, wherein said detecting means includes a memory for storing basic data indicating a relationship between said increase of said temperature detected by said temperature sensor and said water content percentage.

32. The garbage disposal according to claim 31, wherein said detecting means further includes correcting means for correcting said basic data in accordance with said temperature of said mixture.

33. The garbage disposal according to claim 32, wherein said detecting means further includes:

an outside temperature sensor to detect an outside temperature of said garbage disposal; and second correcting means for correcting said basic data in accordance with said outside temperature detected by said outside temperature sensor.

34. The garbage disposal according to claim 25, further including averaging means for averaging a plurality of water content percentages detected by said detecting means.

35. A method of controlling a garbage disposal of a type that decomposes said garbage using microorganisms, comprising steps of:

making a mixture of said garbage and a medium having microorganisms;

detecting a water content percentage of said mixture; and controlling a frequency of stirring said mixture based on said water content percentage.

36. The method of controlling the garbage disposal according to claim 35, further comprising a step of controlling a power of a heating means based on said water content percentage.

37. The method of controlling the garbage disposal according to claim 35, further comprising a step of controlling an air volume of a blower based on said water content percentage.

38. The method of controlling the garbage disposal according to claim 35, wherein said step of detecting said water content percentage comprises:

measuring a torque of a motor included in a stirring means for stirring said mixture;

determining said water content percentage of said mixture based on said torque.

39. A method of controlling a garbage disposal of a type that decomposes garbage using microorganisms, comprising steps of:

making a mixture of said garbage and a medium having said microorganisms;

measuring a torque of a motor included in a stirring means for stirring said mixture;

determining a water content percentage of said mixture based on said torque.

40. A method of controlling a garbage disposal of a type that decomposes garbage using microorganisms, comprising steps of:

making a mixture of said garbage and a medium having microorganisms;

heating said mixture;

detecting a temperature of said mixture;

calculating an increase of said temperature; and determining a water content percentage of said mixture based on said increase.

41. A garbage disposal for decomposing garbage using microorganisms, comprising:

a tank for containing media having said microorganisms, said tank being configured to receive said garbage including organic material to form a mixture;

detecting means for detecting a water content ratio of said mixture;

control means for controlling said water content ratio of said mixture within a predetermined range in accordance with said detected water content ratio.

42. The garbage disposal according to claim 41, further comprising:

stirring means for stirring contents of said tank; and said control means including stirring control means for controlling said stirring means in accordance with said detected water content ratio.

* * * * *